United States Patent
Yutkowitz

(10) Patent No.: US 6,281,650 B1
(45) Date of Patent: Aug. 28, 2001

(54) METHOD AND APPARATUS FOR TUNING CONTROL SYSTEM PARAMETERS

(75) Inventor: Stephen J. Yutkowitz, Hamilton County, OH (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 0 days.

(21) Appl. No.: 09/656,280

(22) Filed: Sep. 6, 2000

Related U.S. Application Data

(63) Continuation of application No. 09/377,881, filed on Aug. 19, 1999.

(51) Int. Cl.[7] .................................................. G05B 13/00
(52) U.S. Cl. ........................ 318/561; 318/568.1; 318/610
(58) Field of Search .............................. 318/561, 568.1, 318/610, 567, 569, 568.22

(56) References Cited

U.S. PATENT DOCUMENTS

| | | | |
|---|---|---|---|
| 4,584,512 | * | 4/1986 | Pritchard ............................ 318/696 |
| 4,965,513 | * | 10/1990 | Haynes et al. .................. 325/158 MG |
| 5,057,760 | * | 10/1991 | Dadpey ................................ 318/807 |
| 5,122,719 | * | 6/1992 | Bessenyei et al. .................... 318/629 |
| 5,375,098 | * | 12/1994 | Malone et al. ........................ 367/83 |
| 5,392,607 | * | 2/1995 | Wu ........................................... 62/6 |
| 5,661,390 | * | 8/1997 | Lipo et al. ............................ 318/803 |
| 6,198,246 | * | 3/2001 | Yutkowitz ............................ 318/561 |

* cited by examiner

Primary Examiner—Robert E. Nappi
Assistant Examiner—Rita Leykin

(57) ABSTRACT

A method and apparatus for tuning control loop parameters in a motion control system, is provided. In one embodiment, tuning of the proportional and integral gains of a servocontroller's velocity loop compensator is provided, as well as tuning of the cutoff frequencies of the servocontroller's low pass filters. In this embodiment, random noise excitation is added to the velocity command during a plurality of movement types for a machine tool axis. During each movement type, frequency response measurements are taken. Then, a composite frequency response can be selected by concatenating portions of the various frequency response measurements, so as to simulate a worst case scenario for the machine tool axis. From this composite response, an open loop response can be calculated and displayed, as well as bandwidth, phase margin, and gain margin values. The user can then enter the compensator parameters which were used when this data was taken, as well as proposed parameters. The system can automatically predict, or simulate, the effects of the proposed parameters on bandwidth, gain margin, and phase margin, based upon the composite data. Accordingly, the user need not actually try out the proposed parameters on the machine. Moreover, the simulated responses for the proposed parameters are based upon actual frequency response data taken during actual operating conditions of the system, and, accordingly, the inaccuracies of using mathematical assumptions are avoided.

53 Claims, 11 Drawing Sheets

METHOD AND APPARATUS FOR TUNING CONTROL SYSTEM PARAMETERS

This is a continuation of U.S. application Ser. No. 09/377,881, filed Aug. 19, 1999, currently pending.

TECHNICAL FIELD

The present invention relates to the general field of controlling machine tools. More particularly, the present invention relates to methods of tuning one or more axis velocity control loops. In one embodiment, this is achieved by direct measurement and analysis of frequency response functions obtained by means of random noise excitation of each of such axes of motion, and under various machine operating conditions, constructing a piecewise matching of frequency response functions so obtained into a composite frequency response function for tuning.

BACKGROUND OF THE INVENTION

The modem manufacturing facility is making increasing use of computers, microprocessors and other machine-based "intelligence" for the purpose of producing articles of uniform high quality. Herein, the machine processing an article will be referred to as the "processing machine" and the article undergoing such processing will be referred to as the "workpiece." The portion of the processing machine physically interacting with the workpiece will be denoted as the "tool" understanding thereby that the tool may be a mechanical cutting, drilling or shaping implement, laser, waterjet or any other device, implement, or form of energy interacting with the workpiece and causing changes therein.

The computer control of the processing machine may take the form of a microprocessor or computer embedded within the particular processing machine and dedicated to the control of that single machine. Computer control may also take the form of a detached mini-, midi-, personal, or mainframe computer, physically separate from the processing machine but electronically connected (wired or wireless) thereto and controlling the machine's processing of the workpiece. A computer may thus control one or more processing machines and may be physically remote from the processing machine, perhaps by many miles utilizing intranet, internet or other modem data transmission technology.

For the purposes of illustration, the present invention will be described in terms of the common case in which the controlling computer is embedded within the processing machine and dedicated to the control of just that machine. However, the present invention is not so limited and numerous particular embodiments of computer control are included within its scope, as would be obvious to those having ordinary skills in the art.

Computer-Numerical-Control "CNC" is the designation for the common machining technique whereby the workpiece and the tool are positioned, oriented and moved through space according to trajectories determined by instructions stored in a computer or microprocessor. In full generality, three variables determine the position of the tool relative to the workpiece in space at any given instant of time while three more variables determine the instantaneous orientation of the tool relative to the workpiece. Thus, the fill control of a workpiece and tool would require the specification of 6 variables as functions of time, determining thereby the trajectories of workpiece and tool and the orientations thereof as each traverses its designated trajectory. Control variables in addition to location and orientation may be required to specify precisely the processing of the workpiece. For example, in laser processing additional commands may be issued by the controlling computer to determine beam power, beam on or off, continuous or pulsed. In practice, CNC machines would control several types of motion and orientation of the workpiece and tool but would typically lack the full flexibility to control every parameter in the processing of the workpiece. Although CNC or computer control of a processing machine, is referenced herein, it is not intended thereby to limit or to exclude any particular form of computer control of orientation, location, trajectory or other processing parameters.

The use herein of "tuning" of the control system or control loop refers to the adjustment of parameters in the control loop to achieve the desired performance of the processing machine. The systems for controlling the workpiece and/or tool during processing must meet several criteria to be effective and robust, producing high quality results in practical production environments. One important criterion for the control system is that it be stable in response to disturbances which may be introduced into the production process in an uncontrolled, random and unpredictable manner. Such disturbances may result from random fluctuations in the torque generated by motors driving the machine, torque ripple, variations in materials properties of the workpiece, random noise in the electronic or mechanical systems, vibrations external to the machine, and many other possible disturbances well known in the art. An unstable control system will not cause the machining process to return to its desired state when such a disturbance is encountered. An unstable system will run as far as the machine allows in a particular direction, oscillate with increasing amplitude or oscillate with a non-decreasing amplitude in response to such a disturbance. Thus, absence of instability, or stability, is one condition necessary for practical operation of a control system.

Improperly tuned machines may affect the quality of the workpiece in one or more undesirable ways. Unstable systems are clearly unacceptable in that any slight disturbance to the processing of the workpiece will typically lead to large processing errors. However, the control system must also be tuned to have adequate margins of stability in order to achieve good quality processing under all reasonable working conditions. That is, the control system must not only be stable but also remain stable when characteristics of the machine change over time during operation. Therefore, it is necessary that the control system remain stable as machine components wear, frictional forces may change over time and/or inertia of various machine components may change.

In addition to being stable with adequate margins of stability, the control system needs to reject disturbances sufficiently strongly such that any perturbations reaching the tool-workpiece interface will be too small, and endure for too short a time period, to affect the quality of the final workpiece. Thus, good stability, margin of stability and disturbance rejection are among the characteristics of a properly functioning machine control system. Achieving these criteria in a practical production environment is one purpose of the present invention.

Several problems may arise for improperly tuned machines even though the control system is stable. For example, variations in the torque output of drive motors, "ripples," invariably present in practical motors will affect the surface finish of the workpiece if the control system too lightly damps such disturbances Additionally, commands from the typical CNC device for controlling the motion of tool and/or workpiece may overshoot in velocity, position or both, resulting in improperly processed parts. Such commands may result in oscillations and cause imperfections in the workpiece beyond the range of acceptability.

In some cases, improper tuning may even result in audible "squeals" being produced by the machine during processing, resulting in a perception of poor quality and perhaps rapid wearing of the machine components. These are a few of the important criteria to be achieved when a machine control loop is adequately tuned. Other criteria are discussed elsewhere herein.

There are many approaches to control loop tuning. In general, there are two broad classifications control loop tuning. In time domain tuning, the time response of the system to certain inputs is measured. Frequently, an abrupt "step" input is provided and the response of the machine with time then determined. Other inputs may be employed within the scope of time domain tuning.

An alternative but mathematically equivalent procedure for analyzing control systems is to make use of the frequency domain, related to the time domain by the Laplace transform. A linear differential equation describing the time behavior of a system (time domain) may be replaced by an equivalent set of algebraic equations in the frequency domain by applying the Laplace transform to all terms of the differential equation. The resulting algebraic equations are typically more easily solved than the time domain differential equations and time domain solutions derived (if necessary) by applying inverse Laplace transform to the solution(s) of the algebraic equations. Also, the Laplace transform may be applied making use of a complex frequency variable, resulting in a description of the system in the complex frequency plane. Complex frequency introduces additional mathematical tools that may be applied in the complex plane for further analysis of the system.

In one embodiment, the present invention makes use of an analysis of the control system in the frequency domain, typically in the range from 0 (dc) to approximately 1,000 Hertz (1 KHz). The response of the system in both magnitude and phase is determined as functions of inputs of various frequencies, most conveniently supplied by means of random noise driving signals containing therein a spectrum of frequencies. Both velocity and position responses are considered. In this embodiment, the system makes use of a direct measurement of the frequency response function ("FRF"), also known as a Bode plot. However, Bode plot signifies to some the use of a mathematical description of the system, necessarily only an approximation to the real machine. This embodiment of the present invention is not dependent on the use of mathematical model or approximation to the system in order to derive the tuning parameters. Rather, it makes use of a directly measured FRF from which the tuning of the system is then derived. Thus, the term "FRF" is used herein.

In one aspect, the present invention relates to tuning a machine tool without introducing a mathematical model of the dynamical behavior of the machine; necessarily an approximation that would have to be re-done from machine to machine. In another aspect, the invention relates to selection of worst-case FRF's (or nearly so) to insure that practical operation of the machine under any feasible conditions will not result in an improperly tuned machine. In an additional aspect, the present invention relates to combining piecewise-FRF data to construct a composite FRF which is used to achieve good tuning parameters. Software tools are described herein as convenient means for performing this composition.

As described more fully elsewhere herein, tuning of a control loop pursuant to the procedures of the present invention is not limited to adjustment of particular electronic or computer components which may be present in the control loop of some machines but not others. The present invention, in one embodiment, provides methods for tuning general control systems by a four step process: 1) Measuring the performance of the system under specified excitations with control loop parameters set at any convenient values (subject to general procedures described in detail elsewhere); 2) Computationally deconvoluting the measured behavior of the system such that the particular parameters under which measurements were made are extracted from the measured behavior, permitting; 3) New parameters to be introduced computationally to determine the effect on the control system of new parameters without further tests involving the processing machine; 4) Testing the processing machine with the computationally-determined tuning parameters. Thus, a correctly tuned machine may be obtained in most cases with extraction of measured data, off-line processing of that data and adjustments of the tuning parameters as determined by the off-line computation. Typically, one such adjustment results in an adequately tuned machine, but the above process can be repeated if additional tuning is required, and/or if periodic tuning is desired.

Thus, one embodiment of the present invention can make use of direct measurement of the frequency response function ("FRF") of the machine to determine the proper tuning parameters. This embodiment does not use an assumed mathematical model of the behavior of the machine and thereby does not introduce the assumptions and simplifications inherent in any mathematical modeling of a real machine.

The description herein will make use of the common Laplace transform notation of control engineering relating continuous time to continuous frequency (complex frequency, in its most general form). However, as digital electronics comes to dominate control engineering, it is known that the Laplace transform can be replaced by the z-transform that relates properties at discrete time intervals to frequency. There is no essential difference in the practice of this invention an analogue form or digital form.

The present invention therefore relates to a method of tuning comprising a composite set of various tuning techniques. The present invention is directed to tuning velocity loops for machine tool under circumstances that the tuning will be stable, have adequate margins of stability and generally provide robust control with ample rejection of disturbances under all plausible operating conditions. Thus, the present tuning method also relates to obtaining various operating conditions of the machine and selecting what are generally worst plausible scenarios under each circumstance. The resultant tuning is a composite of various tuning techniques obtained under various operating conditions resulting in good tuning throughout the operating range. In contrast to prior art tuning methods and apparatus, the tuning methods and apparatus of one aspect of the present invention presume no special components being present in the control or mechanical system, make use of random noise excitations to generate numerous frequency response functions, and mathematically deconvolute the measured machine performance without the need for a mathematical (e.g. differential equation) model for the performance of the system with the attendant uncertainty and arbitrariness of such a model.

SUMMARY OF THE INVENTION

It is an object of the present invention to obviate the above-described problems.

It is another object of the present invention to provide method and apparatus which allows for accurate tuning of control system parameters, such as velocity compensator parameters for example, to thereby provide stable motion control.

Yet another object of the present invention is to provide a method and apparatus for tuning control system parameters which avoid the need to run each set of parameters on the actual system.

Another object of the present invention is to provide a method and apparatus for accurately simulating the effects of a proposed set of control system parameters.

It is another object of the present invention to provide a method and apparatus for tuning control system parameters which avoids the inaccuracy of mathematical models.

Yet another object of the invention is to provide a method and apparatus for tuning control system parameters which is time efficient.

To achieve the foregoing and other objects, a method for tuning parameters of a servocontroller in a motion control system for controlling an actuator is provided. The method comprises setting original parameters in the servocontroller, and applying an excitation signal containing energy over a predefined range of frequencies to the control system. The method also comprises measuring a frequency response of the control system in response to the excitation signal across a range of frequencies, and providing proposed servocontroller parameters. Moreover, the method comprises calculating a predicted frequency response of the control system for the proposed parameters, using the measured frequency response and proposed servocontroller parameters. In addition, the method comprises calculating predicted stability data for the predicted frequency response, and displaying the predicted stability data.

According to another aspect of the invention, a system for tuning control parameters is provided, comprising a motion command generator, an actuator, a velocity sensor coupled to the actuator, and a servocontroller in communication with the motion command generator and the velocity sensor, and configured to generate control signals for control of the actuator. The system also comprises a random noise signal generator in communication with the servocontroller, and a frequency response analyzer in communication with the servocontroller. The random noise signal generator is configured to provide a random noise signal to the servocontroller during controlled motion of the actuator. The frequency response analyzer is configured to generate frequency responses for the random noise signal.

In accordance with another aspect, a user interface for tuning control parameters of a motion control system is provided. The user interface comprises an original amplitude graph representing the measured amplitude frequency response of the motion control system, and an original phase graph representing the measured phase frequency of the motion control system. The interface also includes parameter entry boxes adapted to receive proposed motion control parameters and original motion control parameters. The interface also includes a predicted amplitude graph representing the predicted frequency response of the motion control system for the proposed motion control parameters, and a predicted phase graph representing the predicted phase response of the motion control system for the proposed motion control parameters.

A method for tuning parameters of a servocontroller in a motion control system for controlling an actuator is also provided. The method comprises moving the actuator at a predetermined velocity according to a plurality of movement types using the motion control system, and, during each movement, applying a random noise signal as input to the motion control system. For each movement type, a frequency response function is measured and displayed. Using portions of the frequency response functions, a combined frequency response function is generated to represent the system. The original compensator gains which were used during the movement types are obtained, as are proposed compensator gains. A first servocontroller response is calculated using the original compensator gains, and a second servocontroller response is calculated using the proposed compensator gains, and these responses are used, along with the combined frequency response, to calculated a predicted frequency response for the proposed gains. The predicted stability data can be calculated and displayed for the predicted frequency response.

Still other objects of the present invention will become apparent to those skilled in this art from the following description wherein there is shown and described preferred embodiments of this invention, including a best mode currently contemplated for carrying out the invention, simply for purposes of illustration. Accordingly, the drawings and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF PREFERRED EMBODIMENTS

Figure 1:
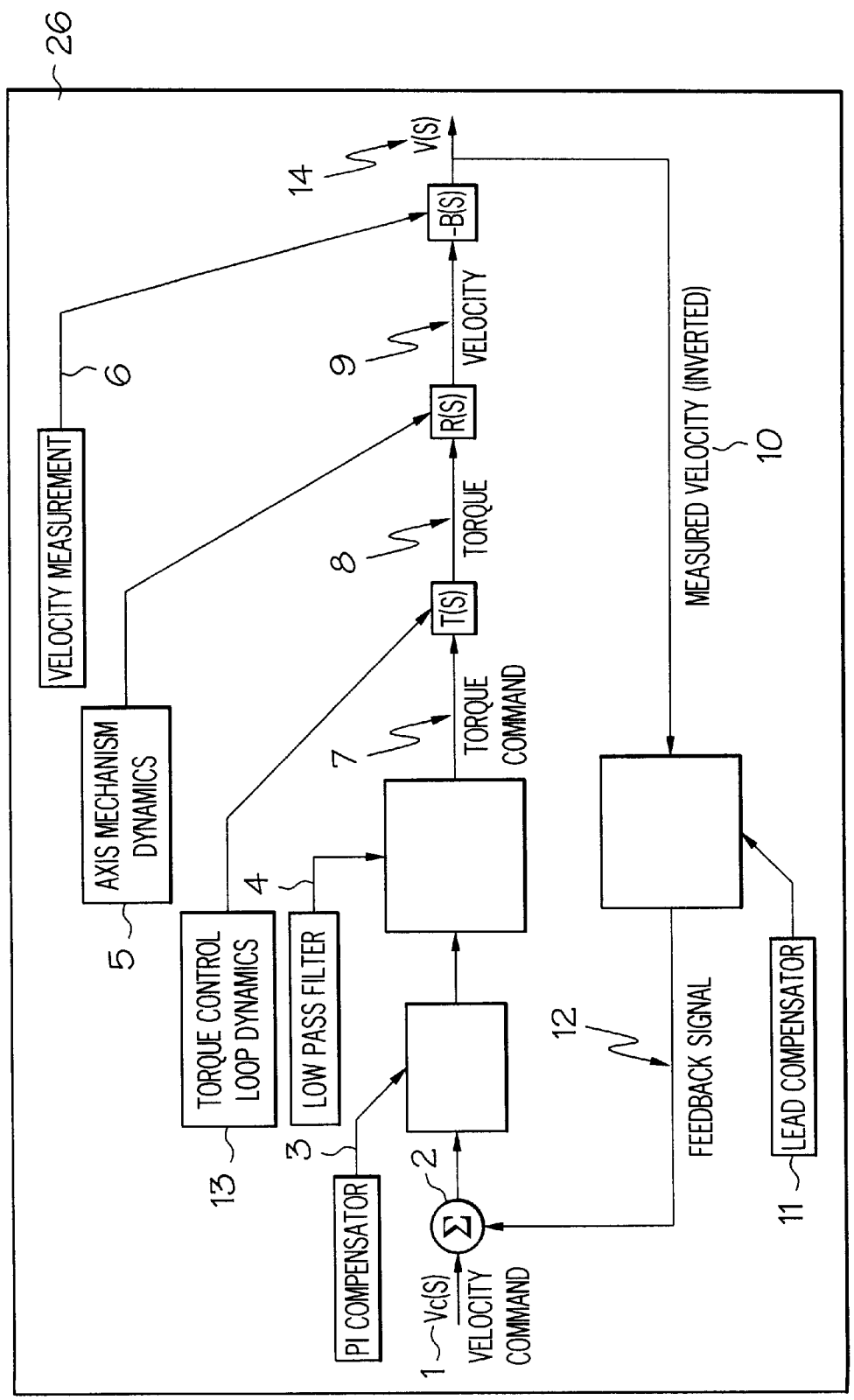
FIG. 1 is a velocity control loop block diagram, including a PI compensator whose parameters can be tuned according to principles of the present invention.

The present invention relates generally to tuning velocity loop controllers in connection with the operation of machine tools. The tuning of such a controller will be described in connection with translational motion along a single axis of motion, with the understanding that arbitrary motion such as translation and orientation, can be described by combinations of motion, along independent axis of the workpiece and/or tool. Thus, tuning along each axis of translation or rotation can be performed by application of the tuning methods of the present invention separately to each axis.

In the operation of milling machines, machining centers, lathes and the like including machine tools with multiple cutters, either the workpiece or tool (or occasionally both) are typically rotated at high speed on a spindle while the spindle and/or other machine components traverse a path (typically under computer control) to machine the workpiece in the desired fashion. The present invention is generally concerned with tuning the controller(s) that direct the translation, rotation, positioning and orientation of the tool and/or workpiece rather than controlling the relatively high speed rotational motion of the spindle. To simplify language, a typical case of a workpiece undergoing translation along a single axis will be described, with the understanding the motion of the workpiece along several axes and/or motion of the tool along several axes are included within the scope of the present tuning methods by application of the present invention to each such axis for workpiece and tool. However, in practical machines translational motion of the workpiece and/or tool is commonly achieved by rotation of a ballscrew or similar threaded drive which results in translational motion. However, rack and pinion systems, linear motors and other means of effecting translation are known in the art and are not intended to be excluded from the present invention. Thus, translational motion of the workpiece and/or tool may typically be actuated by application of a torque to a suitable drive. In the following discussion there is described the typical case of rotation of a threaded drive leading to translational motion. However, it is contemplated that other methods by which translational motion of workpiece and/or tool is accomplished could be utilized. Thus, use of terms related to rotational motions, such as "torque" and the like are intended to be part of the method for controlling translational motion of the workpiece and/or tool, although such terms may be employed in reference to linear motors as well.

Numerous sources of disturbances are present in machining. Torques may not be constant as produced by various drive motors. Slight variations in material can lead to slightly different processing properties. Vibrations from nearby equipment may affect the processing of the workpiece. These and many other factors tending to reduce the quality of the processed workpiece are to be detected and compensated by a properly tuned control system.

It is envisioned that the modem practice of computer controlled machining will make use of digital electronics. However, the present invention is not inherently limited to digital embodiments and can be employed with analog controllers by straight forward modifications of the techniques described herein as would be obvious to those having ordinary skills in the art. The descriptions herein will be in terms of digital embodiments for the purposes of illustration and to describe the generally preferred embodiments, but not intending thereby to exclude non-digital embodiments.

Figure 2:
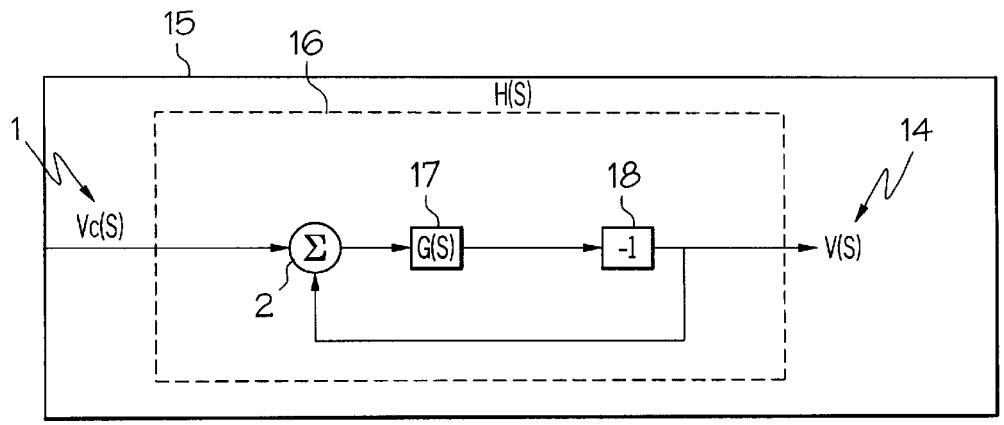
FIG. 2 is a general control block diagram depicting closed and open control loops.

The present invention makes use of both closed loop and open loop control systems. Open loop control is defined as a control system in which the actuation signal is not affected by the output, that is, the absence of feedback. Closed loop control has feedback and the actuation signal is altered in response to the actual output generated by the control system FIG. 2 is a general control diagram for closed and open control loops. The use of the term "s" herein denotes frequency (in general, complex frequency), derived from the time variable by means of application of the Laplace transform as is customary in control engineering. The imaginary component of the parameter "s" is the real frequency "ω." The variable "ω" is the independent variable of a frequency response function. All subsequent equations that employ transfer functions in the Laplace domain (s) apply equally to frequency response functions in the real-frequency domain (ω). The real frequency domain is a "sub-domain" of the Laplace (complex frequency) domain enabling a transfer function to be converted to a frequency response function by evaluating it at s=jω. Reference numeral 1 in FIG. 2 denotes the command velocity typically issued by a computer (not shown) as one component of a general CNC trajectory for the tool and/or workpiece. FIG. 2 depicts control of a single axis of motion.

Reference numeral 2 in FIG. 2 denotes a summing junction used to compare the feedback signal v(s), 14, with the command signal, 1. As reversed in sign by block 18, reference numeral 2 represents a summing junction. Absent the operation of block 18, junction 2 could be a differencing junction without altering the sense of the system represented.

G(s), represented by reference numeral 17, denotes the transfer function, defined in conventional control engineering as the ratio of the Laplace transform of the output variable to the Laplace transform of the input variable. Equivalently, the Laplace transform of the input multiplied by the transfer function yields the Laplace transform of the output. As can be understood, all quantities referenced in the frequency domain can be connected by Laplace transforms (or inverse Laplace transforms) with corresponding quantities in the time domain. Accordingly, the designation of "Laplace transform" will be omitted with the understanding that frequency domain is being used. As depicted in FIG. 2, G(s) is the open loop transfer function relating input to output without feedback signals. H(s) in FIG. 2 denotes the closed loop transfer function that relates output, v(s), 14, to input v(s) 1, in a control system that includes feedback. Open loop and closed loop transfer functions are related by the following equation, in which the sign conventions depicted in FIG. 2 are followed.:

$$G(s)=H(s)/[H(s)-1]$$ Eq. 1

Of course, the same equation applies to the real frequency domain where s is replaced by ω.

Figure 3A:
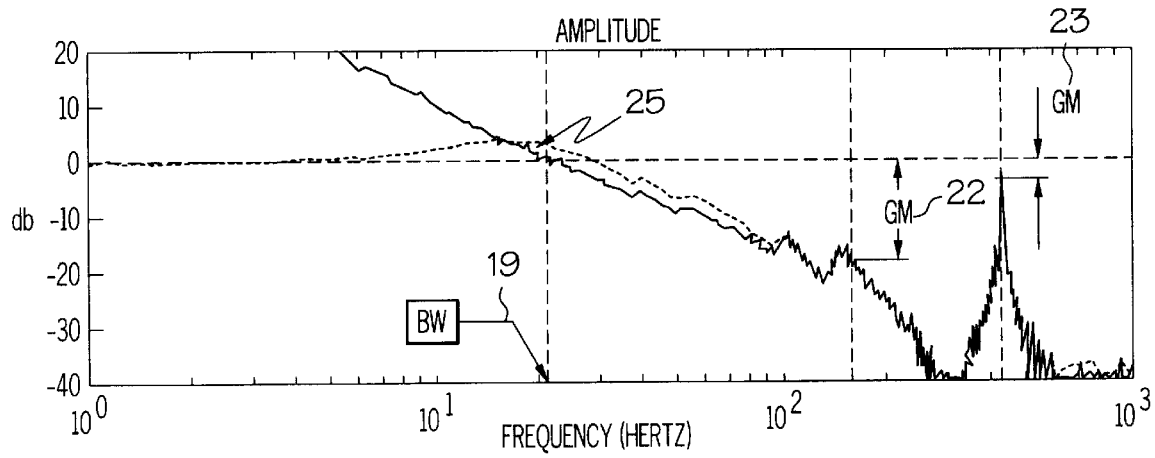
FIG. 3a depicts a frequency response amplitude graph (i.e., function or curve), such as can be developed according to principles of the present invention, and can be used to calculate gain margin and bandwidth.
Figure 3B:
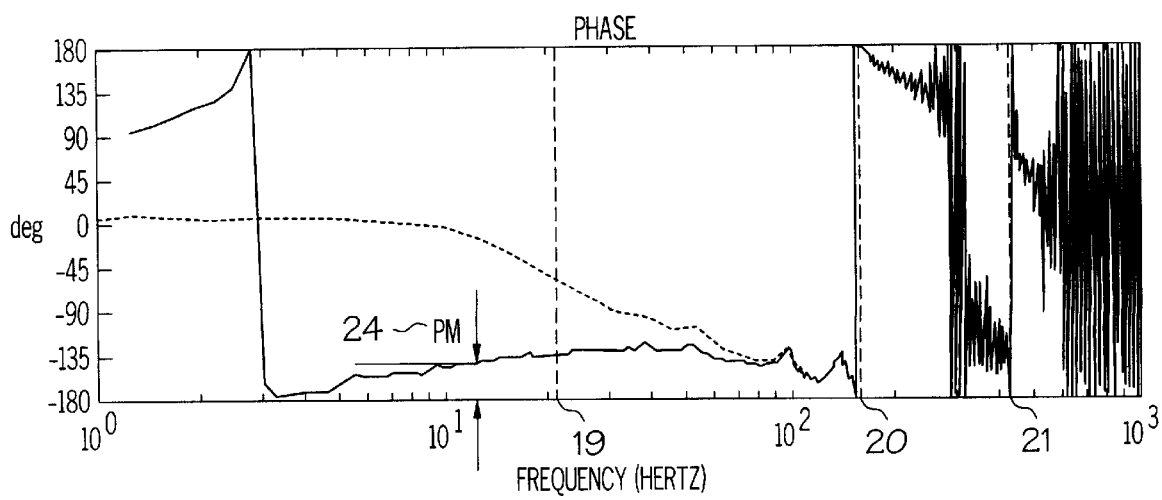
FIG. 3b depicts a frequency response phase graph, such as can be developed by the methods and apparatus described herein, and which can be used to calculate phase margin.

FIG. 3 depicts typical frequency response measurements that would be encountered in the practice of an embodiment of the present invention. Such frequency response functions ("FRF's") depict the amplitude and phase of the output signal when the control system is provided with an input signal of angular frequency ω (or cyclic frequency f). The FRF plot shows these relationships at each frequency ω (or f) over a range of frequencies in this case from f=1 to f=1000. FIG. 3a depicts the magnitude of the signal corresponding to the output velocity v(ω), 14, divided by the input signal corresponding to the signal for generating the velocity command, v(ω), 1. That is, the graph in FIG. 3a is developed by the following equation:

$$|v(\omega)/v_c(\omega)| \qquad \text{Eq. 2}$$

given in the normal notation of decibels, dB, a logarithmic measure of gain. FIG. 3b depicts the phase difference between the input and output signals specified in degrees. This relationship is denoted with the following equation:

$$\angle(v(\omega)/v_c(\omega)) = \angle v(\omega) - \angle v_c(\omega) \qquad \text{Eq. 2.5}$$

The frequency response measurement from velocity-command to velocity-feedback is intended to reproduce the system frequency response function. The system frequency response function h(ω) can be obtained analytically by evaluating the transfer function at h(s=jω) where ω is the frequency in radians/sec and j is the imaginary number defined by j*j=−1. The analysis assumes that the frequency response measurement obtained with a dynamic signal analyzer using the techniques of this invention accurately represents the frequency response of the system. The frequency response measurement is indicated by the tilde (~) character to distinguish it from the actual system frequency response.

$$\tilde{h}(\omega) = h(\omega) = h(s)|_{s=j\omega}, \, j = \sqrt{-1}$$

It should be apparent that the frequency response function is a complex-valued function of the frequency ω. The complex numbers can be represented on a digital computer by using ordered pairs, and evaluating arithmetic operations such as add, subtract, multiply, and divide using rules for these operations on ordered pairs. The amplitude and phase relationship between the input signal $V_c$ and the output signal $V_f$ can be obtained by evaluating the amplitude and phase of the complex number for each frequency ω.

$$|\tilde{h}(\omega)| = \sqrt{(\text{Re}(+e, \text{otl } \tilde{h}(\omega)))^2 + (\text{Im}(\tilde{h}(\omega)))^{2+ee}}$$

$$\angle(\tilde{h}(\omega)) = \tan^{-1}\left(\frac{\text{Im}(\tilde{h}(\omega))}{\text{Re}(\tilde{h}(\omega))}\right)$$

The solid curves in FIGS. 3a and 3b denote typical open loop frequency response functions and the dotted curves depict typical closed loop FRF's. In practice, the closed loop FRF is measured according to procedures described in detail below and the open loop FRF is computed therefrom according to procedures well known in control engineering and briefly noted above.

FIG. 3a also defines some useful concepts needed for a description of the present invention. Reference numeral 19 in FIG. 3a indicates the "bandwidth" defined herein as the frequency at which the open loop response has unit amplitude, that is 0 dB on the logarithmic decibel scale. The width of the bandwidth is understood to be from 0 Hz to the 0 dB open loop crossing point. The higher the bandwidth, the more the system is capable of rejecting disturbances, such as the motor torque ripple. Thus, one performance criteria to be obtained in the practice of the tuning methods of the present invention is to achieve high bandwidth.

"Margin of stability" relates to the amount by which the parameters of the system can change and still have a stable control system. The control loop will produce an output signal changed in magnitude from the input (the gain) and changed in phase from the input. Margins of stability relate to both gain and phase, and are depicted separately in FIGS. 3a and 3b respectively.

The frequency (or frequencies) at which the open loop phase passes through ±180° with negative slope determine the gain margin of stability. FIG. 3b depicts phase from +180° at the upper extreme to −180° at the lower extreme, both representing the same phase relationship. Thus, curves of phase in FIG. 3b contacting −180° with negative slope scrolls to the top of the diagram where they reappear. Frequencies 20 and 21 have the open loop phase (solid curve) passing through 180° with negative slope. Translating these frequencies to the gain plot of FIG. 3a gives the relevant gain margins of stability, 22 and 23 respectively. A system is unstable if the open loop amplitude is greater than 0 dB at a location where the open loop phase passes through ±180° with negative slope. The amount by which the amplitude is below 0 dB at this point (or points) is a measure of how much the parameters of the system must change before instability results. That is, the gain margin is a direct indicator of how close the system is to being unstable and the smaller the gain margin, the closer the system is to being unstable.

The margin of stability in the phase, "phase margin" or "PM" in FIG. 3b is the amount by which the open loop phase differs from ±180° (the smaller value) at that frequency at which the open loop amplitude is 0 dB, that is the bandwidth. This frequency is denoted by 19 in FIG. 3a and 3b, giving the phase margin denoted as 24 in FIG. 3b. The phase margin is evaluated at every frequency where the open-loop amplitude intersects the 0 dB line—in FIG. 3 this occurs only once at frequency 19. The phase margin is another indicator of the system stability and the amount by which the parameters of the system can change and still be stable. A small phase margin is an indicator of the tendency of the servo system to create servo-induced resonances or to aggravate mechanical resonances. The typical tendency is for phase margins below approximately 60°, servo resonances tend to be created and mechanical resonances tend to be aggravated. Such a resonance is depicted in FIG. 3a on the closed loop amplitude (dotted line) as 25 FIG. 3a. This is known as a "passband resonance," resulting from the relatively low phase margin of stability depicted in FIG. 3.

FIG. 1 shows a control diagram for a typical velocity loop controller of the type generally the subject of one embodiment of the present invention The techniques of the present invention relate to general methods for tuning, thereby applicable to both digital and analogue embodiments. Digital circuitry is considered to be the preferred method for controlling CNC machines so the discussion herein will emphasize digital electronics for definiteness. Applications to analogue circuits will be obvious to those having ordinary skills in the art.

Reference numeral 1 in FIG. 1 indicates the electrical signal corresponding to the velocity command typically issued by a computer (not depicted in FIG. 1). This command velocity signal is typically combined with a feedback velocity signal, 12 by a means of a summing junction, 2. Depicted in FIG. 1 is the typical case in the practice of an embodiment of the present invention in which the feedback velocity signal, 14 is inverted (changed in sign) from the actual velocity. Thus, the summer, 2, combines the inverted feedback signal, 12, with the command velocity, 1, by means of a summing junction or similar circuit. More generally, junction 2, could be a sum or difference circuit, with the feedback signal having the appropriate sign, with no essential difference in operation.

FIG. 1 shows several components of the feedback loop as they would typically be employed in practical machine control. They are depicted in FIG. 1 as separate elements to make more concrete the connection with the actual machine that is to be tuned according to the principles of present invention. In practice, the several components depicted as separate in FIG. 1 may be viewed as additional tuning variables. That is, separate components in FIG. 1 result in additional parameters to be adjusted. Procedures for adjusting these parameters are the basic subject of the present invention. Control loops having more, less or different components from that depicted in FIG. 1 are not excluded from the practice of the present invention.

Reference numeral 3 in FIG. 1 denotes a compensator commonly employed in control velocity controllers. The "PI compensator" denotes a "proportional plus integral" compensator in which the output of compensator, 3, is a sum of two components (P+I); one component whose gain is proportional ("P") to the input signal and the second component determined by scaling the integral of the input signal ("I"). In general, the proportional gain term of a compensator is used to generate gain over a wide frequency range and is typically tuned to overcome the tendency of increased inertia to lower the bandwidth (responsiveness) of a velocity controller. The integral term provides gain over a narrower frequency range than the proportional term and its effects are limited to lower frequencies. The integral gain is typically tuned to overcome energy loss effects such as linear and nonlinear friction forces and torques which, if not accounted for, tend to limit the bandwidth. More specifically, an integrator is required to achieve accurate reproduction of a constant command velocity if the mechanical system contains friction. If an integrator is not present on a system with friction, then the developed velocity will be lower than the desired velocity. Other compensators commonly used in controllers may contain output determined by the derivative of the input signal, resulting in a "PID" compensator. The present invention makes use preferably of a PI compensator as depicted in FIG. 1, the parameters of which are determined pursuant to the methods of the present invention as discussed herein. However, PI, PID, lead-lag, generalized filter and the like can also be used within the scope of the present invention. FIG. 1 depicts a low pass filter as reference numeral 4. It is included in FIG. 1 to denote that such a circuit element is commonly employed in velocity control loops, but its presence is not necessary in the practice of the present invention. The properties of the low pass filter (if present) provide additional parameters to be adjusted according to methods of the present invention in properly tuning the velocity loop controller.

The velocity command 1, combined with the feedback signal, 12, in summing junction, 2, passing through PI compensator, 3, and (perhaps) a low pass filter, 4, produces a torque command, 7, that is the required level of torque the drive motor of a particular machine must produce to achieve the desired velocity. This torque command, 7, is processed by a current controller, 13 having transfer function T(s), producing an actual torque 8. This actual torque, 8, drives an axis by means of a ballscrew or the like, denoted as 5. The dynamics of this axis relates torque input to velocity output by the transfer function R(s). Thus, R(s) contains the mechanical and dynamical characteristics of the machine including frictional effects, mechanical resonances, inertia effects, etc. The control loop is described herein by means of one typical case in which translational motion is achieved by means of rotation of a ballscrew or similar drive by means of a drive motor. Thus, translational velocities are achieved by means of the issuance of appropriate torque commands. (However, as noted above, the present invention is not inherently so limited and may be applied to different means of achieving translational motion as would be obvious to those having ordinary skills in the art.) In response to torque, 8, an actual translational velocity, 9 is generated. This actual velocity, 9, is measured by a suitable sensor, 6, having transfer characteristics B(s), typically changed in sign for feedback to summing junction, 2, as inverted measured velocity, 10. The sensor resulting in a determination of actual velocity, 9, may be a direct measurement of translational velocity by a suitable linear velocity sensor, or (more typically) an optical encoder or other device measuring actual rotational motion of the drive motor from which linear translational velocity may be derived. Such an optical encoder (or similar sensor) may be used to determine both position and velocity as is typically done in the machine tools that are the subject of the present invention. In an alternate embodiment, an optical encoder or the like would measure the rotational motion of the drive motor, determining thereby the velocity. Position would be measured directly in this alternate embodiment making use of a linear scale or other position-sensing device, typically attached to the guideway over which the linear motion occurs, as are well known in the art.

Measured velocity, 10 is directed to summing junction, 2, perhaps through a lead compensator, 11. The presence or absence of such a lead compensator makes no essential difference in the practice of the present invention. It provides an additional tuning parameter (or parameters) that may be employed in tuning the control loop pursuant to the present invention. Such lead compensator is included as reference numeral 11 in FIG. 1 to illustrate that this component may be present in practical control systems encountered on machines to be tuned pursuant to the present invention. Such machines could include, for example, lathes, and vertical machining centers. The velocity command 1 in FIG. 1 is typically developed by a position control loop that subtracts the measured feedback position from the desired position to obtain a position error and multiplies the position error by a position loop gain. In addition to the component derived from position error, the velocity command may contain a velocity feedforward component that is the scaled change in position command over the most recent time interval. The practice of the present invention is not essentially different in either case.

Figure 4:
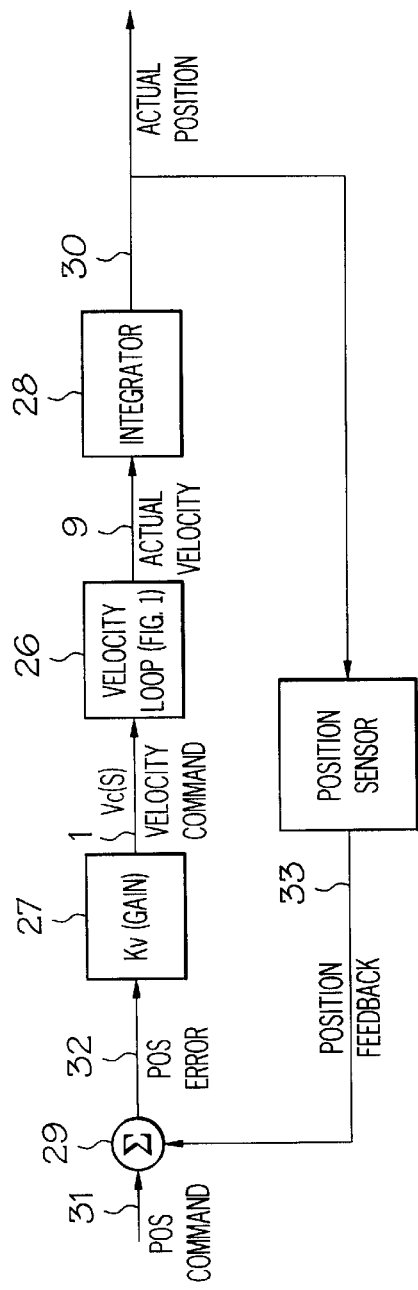
FIG. 4 is a control block diagram for a typical position control loop and its relation to velocity control loop, the parameters of which can be tuned using aspects of the present invention.

FIG. 4 depicts a control diagram for a typical position control loop and its relation to velocity control loop. Reference numeral 26 in FIG. 1 refers to the velocity control loop having command velocity, 1, as input and actual velocity, 9, as output. For ease of depiction, this entire loop is denoted by 26 in FIG. 4 with a single input and a single output corresponding to command velocity and actual velocity respectively. Accordingly, reference numeral 26 in FIG. 4 represents the closed velocity loop of FIG. 1. The output from 26 is the actual velocity 14, which is depicted in FIG. 1 as well as in FIG. 4. This output may be integrated by integrator element 28 to produce a signal corresponding to the position, 30. An optical encoder or similar sensor determining the rotation of a ballscrew or similar drive can be used both to determine the velocity for the velocity feedback loop of FIG. 1, and also to determine position for use in connection with the position feedback loop of FIG. 4. Alternatively, the optical encoder or other rotation sensor determines velocity for use in the velocity feedback loop of FIG. 1 while a linear scale or similar position directly determines position feedback for use in connection with the position feedback loop of FIG. 4. Direct measurement of position is the preferred technique when higher accuracy is required as this procedure is typically more accurate than calculating position from known pitch of the ballscrew drive, including corrections for imperfect pitch, temperature changes, etc. Direct position measurement adds to the cost of the control system as well as adding to the accuracy.

The signal corresponding to position, shown as 30 in FIG. 4, is fed back to summing junction or other comparison circuitry, 29, (taking proper account of any changes of sign of position value 30 introduced by integrator, 28, or other circuit elements specifically inserted into feedback in order to change sign, but not depicted in FIG. 4). Summing junction 29, produces a signal corresponding to error in position, shown at numeral 32, which is multiplied by a factor $K_v$ by digital multiplier, 27. Analogue embodiments would use an amplifier with gain $K_v$ as element 27 with no essential change in the practice of the present invention. The error in position is used as input for the closed velocity loop, 26. Thus, in order to preserve the proper units, the multiplicative gain factor $K_v$ would need to have the proper units to convert a signal corresponding to position, 32, into a signal corresponding to velocity, 1. Thus, $K_v$ would have units of inverse time, which yield a velocity when multiplied by a position. Typically, $K_v$ would be in units of inches per minute per mil (where one mil is 0.001 inch), resulting in $K_v$ having units of inverse minutes multiplied by 1000. Since inverse time is a frequency, $K_v$ as used herein corresponds to the bandwidth of the closed position loop depicted in FIG. 4. One aspect of the present invention is that the bandwidth of the position loop is to be set at a lower value than the bandwidth of the velocity loop to insure good stability and proper performance of the overall control system.

Conversions of angular velocity to linear velocity and/or position are required to ensure that the combinations of electrical signals are as defined and used herein. The details of the circuitry can be implemented in manners customary in the art so the manipulations required for the tuning procedures of the present invention are performed by means of proper combinations of quantities.

A primary subject of the present invention is the tuning of the velocity control loop for proper performance of a machine tool. This is carried out by means of frequency response functions as described in detail herein. However, FIG. 4 illustrates that the velocity control loop, 26, is embedded in the position control loop of FIG. 4. Thus, the measured behavior of the velocity control loop will be affected by the characteristics of the position control loop of which it is a part. Four general possibilities obtain: open or closed velocity loop embedded in an open or closed position loop. Various combinations are utilized in obtaining proper tuning according to the methods of the present invention as specified in detail elsewhere herein.

Referring to FIG. 3, the bandwidth, 19, is depicted for a velocity loop at approximately 20 Hz. Typical bandwidth values are in the range from approximately 10 Hz to 50 Hz or higher. Small values of velocity loop bandwidth are preferably avoided. That is, tuning parameters are to be selected so the bandwidth of the closed velocity loop frequency response function lies at reasonably high values, preferably not lower than about 15 Hz. High bandwidth is an indication of high gain in the velocity loop compensator. This is important in a control system capable of adequately rejecting disturbances. High bandwidth indicates a control system capable of responding to disturbances (typically torques) by sufficiently quickly generating an opposing torque so disturbances in the processing of the workpiece are negligible. As a general rule, high gain and high bandwidth is desirable in closed loop controllers.

The approximate lower value of bandwidth of 15 Hz value is a general guideline for the lower limit of acceptable velocity loop tuning according to the methods of the present invention and is not intended to be a lower limit to the applicability of the present invention. Bandwidth values lower than 15 Hz are not inherently excluded in the practice of the present invention but are likely to be acceptable only in atypical circumstances.

Velocity loop bandwidth needs to be higher than the position loop bandwidth to achieve adequate performance, and it is preferred that the velocity loop bandwidth is substantially higher than the position loop bandwidth. Stability of the controller is called into question if this condition is not met. High $K_v$ in a closed position loop (27 in FIG. 4) relates to high position loop bandwidth. If the velocity loop embedded in this high $K_v$ position loop has too small a bandwidth, overshoot in response to position commands becomes more likely, risking gouged workpieces. It is the nature of typical closed loop control that imposing a high gain ($K_v$) to a low bandwidth system (that is, the embedded velocity loop) is contraindicated.

One can measure and plot gain and phase frequency response functions ("FRF") for a closed position loop in a manner analogous to the FRF for closed velocity loop depicted in FIG. 3. The FRF y-axis for position loop is the magnitude of the ratio of command position to actual position. That is, $$\|X(\omega)/X_c(\omega)\| \qquad \text{Eq. 3}$$

in which $X(\omega)$ is the actual position denoted by 30 in FIG. 4 and $X_c(\omega)$ is the position command corresponding to 31 in FIG. 4 analogous to actual velocity 14 and velocity command 1 respectively in FIG. 1. Such FRF's for closed position loops tend to be very similar to the corresponding FRF's for the closed velocity loops embedded herein, but tending to have an increased rate of amplitude attenuation and phase lag with frequency. In practice, one is not generally concerned with the details of the position loop FRF since achieving a high velocity loop bandwidth according to the methods of the present invention allows one to achieve a reasonably large value for $K_v$. Thus, position loop FRF's are not typically measured in practice since the velocity loop provides more stringent tuning requirements. Achieving sufficiently high velocity loop bandwidth readily permits one to achieve a sufficiently high $K_v$ such that measuring the FRF for the position loop is not necessary.

The present method of tuning is not restricted to a single drive or controller design. Older drives in the machine tool industry tended to be primarily analogue with analogue controller circuits and components. In these analogue-type controllers, the PI compensator is implemented with analogue circuit components: capacitors, op-amps, resistors, etc. Digital circuits and computers are the preferred method for implementing the present invention using typically encoders counting encoder pulses at small time intervals to give highly accurate determinations of rotational motion. The present invention relates to methods for tuning velocity control loops to achieve proper performance of machine tools. The techniques described herein may be employed on control systems having various components embodied in various circuits. That is, a low pass filter may (or may not) be present along with the PI compensator. The presence of additional components merely gives the technician additional degrees of freedom to employ in tuning the control loop. That is, the present invention gives desired performance characteristics for velocity control loops and preferred ways to achieve these desired parameters in practice. In particular, the control system will typically have additional filtering as shown at reference numeral 4 in FIG. 1 supplementing the PI compensator. The present invention is applicable to tuning such systems, but is also capable of tuning systems lacking such filtering components. Similarly, the lead compensator in the feedback path, 11 in FIG. 1, provides additional tuning parameters at the disposal of the technician in tuning the control system to achieve the desired performance. The techniques of the present invention are applicable to control systems having a lead compensator and also to control systems in which it is lacking. The tuning techniques of the present invention are sufficiently adaptable so as to accommodate the presence (or absence) of these additional components such as filter 4 and compensator 11 in FIG. 1.

The present invention has advantages both in what it does and what it does not do. The present invention utilizes direct measurements of the frequency response function of the machine without the imposition of a mathematical model. This is to be contrasted with other tuning methods in which a mathematical model of the machine is constructed. In these other methods, a mathematical model for the system must be presumed, and then measurements may be performed to estimate one or more parameters of this presumed mathematical model. The model is then used to predict the values of parameters to provide adequate tuning of the machine. Thus, tuning in such a case is limited by the accuracy and flexibility of the presumed model.

In contrast, the present method uses only direct measurements of the machine under various operating conditions to elucidate directly the behavior of the control system. The control system on any machine will have a limited number of adjustments possible by the technician. The present invention, according to one embodiment, deconvolutes the behavior of the PI (or other type of) compensator, low pass filter (if any) and lead (or other type of feedback path) compensator (if any) to remove the effect of the particular tuning parameters under which frequency response data were obtained. Then, the actual parameters are replaced with revised parameters derived according to the techniques of the present invention. These revised parameters are chosen to give adequate performance of the control system under any reasonably likely operating conditions.

According to the one aspect of the present invention, parameters of the control system of the machine are tuned in response to data obtained under stringent operating conditions. That is, the tuning techniques according to the present invention make use of worst-case (or nearly so) operating conditions in order to insure that the machine will remain stable and well tuned under any reasonably plausible circumstances that may be encountered in actual operation.

The tuning of the control system on a machine tool must be stable, robust and with adequate margins of gain and phase stability. Stability and margins of stability are discussed elsewhere herein. "Robust" is used to denote the overall insensitivity of the control system to variations in system characteristics.

An adequately tuned control system must have anticipated and prepared for variations in operating conditions encountered in operations. For example, the inertia of the system will change depending on the mass of the workpiece to be moved about, as the drive must move the table and the workpiece in response to the computer commands. Friction will also typically vary as the machine ages, components wear and variations in lubrication may occur during processing. Thus, margin of stability refers qualitatively to the amount by which such operating conditions of the machine may change (inertia, friction, etc.) and still have stable operation and acceptable rejection of disturbances to produce finished parts of high quality. Translating such qualitative notions of stability into quantitative tuning parameters and guidelines is one of the goals of the present invention.

The tuning methods according to one aspect of the present invention make use of worst-case scenarios whenever possible. That is, this aspect of the present invention strives to tune the control loop(s) under conditions as stringent as those reasonably likely to be encountered in practice.

According to another aspect, the present invention also recognizes that different factors have different effects on various parts of the frequency response function. The low frequency response of the control system will be sensitive to different factors and/or in different ways than will the high frequency response. To insure adequate tuning of the control loop(s), it is thus preferred to examine the behavior of the system under various conditions and under various tuning parameters. One aspect of the present invention relates to several types of frequency response measurements obtained during various different forms of machine motion. This aspect of the present invention makes use of a concatenation of these various frequency response functions ("FRF's") performed in such a way as to use the most stringent tests of tuning for each segment of FRF. Software tools to conveniently perform this matching are also described.

FIG. 3 and the descriptions given herein define gain and phase margins of stability. The present invention contrasts with many other approaches to tuning velocity control loops in that (among other features) the present invention does not assume a specific mathematical model for the dynamics of the machine. The present invention can measure frequency response functions under conditions likely to provide the most stringent criteria feasible. The actual measured data, not fit to any assumed mathematical form, are then used to remove the effects of the tuning parameters under which the data was collected, that is "deconvoluted." Then, new, adjusted parameter values are tested computationally making use of the deconvoluted data to re-introduce new values and the effects of these new values for the compensator parameters on stability margins are determined. Thus, off-line computations provide direct indications of tuning parameters in the present invention directly from measured data.

At least the following considerations are important in determining system behavior, at least under operating conditions in which mechanical resonances are absent in the low frequency range: inertia, viscous friction, phase lag, and mechanical resonances.

High values of inertia tend to cause the open loop gain FRF to shift downward, typically without substantial alteration in shape. Thus, this downward shift causes the 0-dB crossing to shift to lower frequency. In the absence of resonances, the phase FRF is not affected by changes in inertia.

The second significant factor is the presence of viscous friction operating on the system as a whole. The system tends to move as a whole at the lowest frequencies since no mechanical resonances are typically present at these low frequencies and there is ample time for motion initiated at one place in the machine to propagate through the various mechanical components to appear at all other places. That is, at low frequencies the machine appears to be rigid and responds as a whole. Viscous friction affects the phase and amplitude FRF at lower frequencies. The integrator portion of the PI compensator also affects the phase and amplitude at the lower frequencies. As previously stated the integrator portion of the PI compensator is attempting to counteract the effect of viscous friction in the system. A PI compensator tends to display open loop amplitude and phase characteristics that are the inverse of the amplitude and phase characteristics of viscous friction. The proportional gain part of the PI compensator tends to move the gain FRF up or down without substantial effect on the phase FRF.

There is also an overall phase lag that increases with frequency due to the utilization of sensors making measurements at discrete time intervals. For example, there is a time delay in the actual attainment of a given velocity by the drive motor to the time such velocity is sensed and reported to the controller and acted upon. This causes a phase lag in the overall control system, such phase lag tending to increase approximately linearly with frequency. Time delays of the order of the sampling interval are typical, or greater or less than the sampling interval depending on the details of the particular controller. Time delays tend to increase the phase lag as the delay increases.

Mechanical resonances due to mechanical compliance can have a large effect on both amplitude and phase over a local frequency range. The presence of such resonances can often be a dominant and performance-limiting factor.

Gain margin and phase margin as depicted and described in connection with FIG. 3 should be large without reducing bandwidth, but certain guidelines have proven useful in practice. These guidelines are not inherent limitations in the practice of the present invention, but illustrate typical values found useful.

There are several affects that may occur to degrade the performance of the control system if the gain and/or phase margins of stability are too small. For example, the measure of gain and phase margins defined herein relate to the open loop FRF's. The transition from open to closed loop tends to introduce undesirable resonances in the FRF's if the stability margins are too small. Depicted in FIG. 3 is an example where, upon going from open to closed loop, the servo produces a small resonance. Such "servo-induced resonance" is depicted as 25 in FIG. 3. As the phase margin becomes smaller, the size of the servo-induced resonance increases. Avoidance of too much of this effect to achieve good performance of the velocity loop controller is yet another reason for having suitably large gain and phase margins of stability. If the servo-induced resonance is too large, overshoots may occur at that frequency resulting in poor workpiece/tool trajectories and poor quality.

Among the criteria of good performance which can be achieved by the tuning techniques of the present invention are the following: A high bandwidth system, a phase margin of at least 45 degrees and a gain margin of at least 10 dB. These parameters provide both good performance and a comfortable margin of gain and phase stability. These are guidelines to be striven towards in the practice of the present invention but not inherent limitations on the range of applicability of the present invention. As increased bandwidths are achieved, gain and phase margins of stability tend to decrease. Design tradeoffs to achieve all desired parameters are necessary. Typical bandwidths for conventional machine tools may be the range 15–40 Hz and achieve adequate performance. Higher bandwidths are achievable for some systems up to about 50 Hz. While there is no fixed minimum bandwidth inherent in the scope of the present invention, a bandwidth below about 15 Hz is generally cause for continued tuning to achieve a higher value. The achievable bandwidth can vary substantially depending on the mechanics of the particular axis. One goal of the present invention is to employ direct measurements and analysis to achieve the highest bandwidth possible while meeting the minimum stability margin criteria Thus the present invention allows the user of the invention to fully utilize the capabilities of the machine regardless of the particular value of the achievable bandwidth. Further improvement in performance beyond those obtained by tuning would require other changes, such as the implementation of design changes to the axis mechanics or the retrofitting of new motors and or velocity controllers. Furthermore, the bandwidth requirement for an axis depends on the type of performance expected from the axis which itself depends on the nature of the machining processes undertaken by the machine tool. If the achievable bandwidth is not sufficient for the machine requirements, then no amount of tuning can rectify the situation. Once again, the present invention provides an approach to servo tuning that enables the user to set up the velocity loop to obtain (or nearly obtain) the optimal performance capabilities of the existing system.

The tuning techniques of the present invention have as one aspect thereof direct use of gain and phase FRF's. As noted above, this contrasts with other approaches in which mathematical models are used to derive approximate transfer functions, gain and phase margins. The correlation of this information with the actual performance of the machine under various circumstances can be speculative and suspect. In contrast, one aspect of the present invention uses direct measurement of the FRF's to obtain gain and phase margins with given values of proportional and integral gain from the PI compensator (and any other relevant machine parameters as used in producing the FRF's). This embodiment of the present invention directly manipulates the measured FRF's to derive other gain and phase margins that would be obtained if the parameters of the PI compensator (and/or other components that will be presumed hereinafter without repetition) were varied in the specified way. Thus, the uncertainty related to the accuracy with which the mathematical model correctly describes the actual machine is removed.

This embodiment of the present invention removes the effect of the PI compensator (filter, lead compensator or similar device) by a mathematical deconvolution and re-determines the effect of the PI compensator with different presumed parameters as given below by Equations (7)–(9). Thus, adjustment of the PI compensator's parameters is performed "off-line" by the techniques of the present invention with some confidence that the control system resulting from adjusting the PI compensator to the new values will demonstrate adequate performance. Simply stated, the effect of the compensator under which FRF's were measured are computationally removed from the measurement leaving only those characteristics of machine, motor drive etc. that the technician will not alter by tuning of the velocity control loop(s).

The effects of new parameters are then computationally determined before actual measurements on the system are performed. Thus, trial-and-error tuning to achieve adequate performance is avoided by computationally choosing parameters using principles of the present invention. It is envisioned that very few tests of the FRF's, perhaps only a single test, will need to be performed to confirm that the tuning parameters derived from the techniques of the present invention achieve acceptable performance throughout the operating range.

In contrast typical prior art methods for tuning velocity control loop(s) may involve trial and error. A measurement might be taken, typically gain and phase FRF's. Adjustments are then made to various system parameters, following the experience and intuition of the technician, and the measurement repeated. Adjustments are made in an iterative manner as the adjustments appear to be improving performance until the subjective judgment of the technician indicates that the system is ready to go into service. The present method can replace the subjective judgment, trial and error of the technician for mathematically based computations of the performance to be expected if certain parameter adjustments are made, eliminating trial and error, subjective evaluations and most of the iterative testing.

The basic approach of tuning techniques according to the present invention involves determining gain and phase FRF's under conditions likely to be among the worst cases for evaluating system stability, gain and phase margins of stability. Thus, actual operation of the machine is expected to place less stringent demands on the control loop(s) than those encountered during tuning.

It is preferred in the practice of the present invention to use random noise excitations to generate the FRF's. Such a signal provides equal energy at all frequencies in the bandwidth of interest. This is to be contrasted with alternative approaches using a step input to perturb the system and analyze the response. It has been found, according to one aspect of the invention, that random noise input excites essentially all frequencies of interest (a typical frequency range for excitation would be 0 to 1 kHz). Many such random noise excitations provide many separate measurements and FRF's, permitting averages to be then to extract only the genuine features of the control system (that is, random deviations tend to average to zero leaving only genuine properties of the control system in the measurement).

The preferred technique for tuning the velocity control loop according to the present invention makes use of an almost open position loop and a closed velocity loop in determining FRF's. A fully open position loop has the disadvantage that, totally lacking feedback, the axis would tend to drift. Modest feedback is necessary to avoid drift. If the position loop of FIG. 4 were fully closed, it would reject low frequency components of the random noise excitation, giving erroneous measurements for low frequencies. Thus, the gain, $K_v$ supplied by 27 is small but not zero. (Note that zero $K_v$ gain, 27, effectively opens the position loop). Very small but non-zero $K_v$ provides sufficient feedback to prevent the axis from drifting, but has no effect on the frequency response functions other than very small (effectively zero) frequencies. Thus, one technique useful in the practice of the present invention is to employ very small, but non-zero $K_v$. Effectively, the FRF so obtained is the same as that obtained with an open position loop except at lowest frequencies approaching 0 Hertz ("DC"). Use of a closed position loop (that is, $K_v$ being of reasonable magnitude) would corrupt the data for the velocity loop response function. In effect, one would be measuring a position loop FRF rather than the desired velocity loop FRF. Thus, use of a closed position loop is contraindicated, but a fully open position loop also has disadvantages. Typically, for purposes of this measurement $K_v$ would be set at approximately 1% of its customary value during normal operation. For example, if the normal $K_v$ is 2, $K_v$ is preferably set at 0.02 for tuning purposes. Thus, the velocity loop FRF is expected to be corrupted below about 0.05 Hz. Such low frequency values of the closed velocity loop FRF are expected to be flat so any anomalies present in the FRF's at very small values are expected to be anomalous and to be discarded. These values are guidelines only and not intended to limit the present invention. The essential feature is to prevent axis drift but not reject any significant value of excitation frequencies.

It is also preferred in the practice of the present invention to make FRF measurements when the various components are in motion. That is, in the traverse of a platform on the machine, measurements are to be taken over those regions of traverse in which the platform does not come to rest. This rule is used to avoid measuring the system under conditions when it is exposed to Coulomb friction, lost-motion, or backlash. These nonlinear effects are commonly found on machine tool drive-trains and are typically manifest only at zero or near-zero velocity. These nonlinear effects provide a stabilizing influence to the system and the FRF measurement taken on the system exposed to these effects would not represent a worst-case operating point.

There is a practical trade-off to be made in selecting the translation speed at which the FRF measurements are to be taken related to the number of measurements taken (that is, obtaining sufficient measurements for meaningful averages to be calculated), the velocity and amplitude of random noise must be sufficiently large to avoid competition from external noise. The translational motion must be of sufficiently high velocity that the superimposed random noise will never (or almost never) cause the translational motion to become zero. That is, the peak-to-peak amplitude of the axis velocity in response to the noise source must be less than the platform's constant component of velocity (translational motion). On the other hand, the translational motion component of velocity over which the random noise is superimposed can not be too large or the full traverse will be accomplished before adequate measurements have been taken. Proper FRF measurements are best made many times and averages taken. When the speed of traverse is too fast, full traverse occurs before sufficient data is collected. Thus a balance is needed between the speed at which the measurements are taken, and the number of measurements.

In practice, it is also preferred that various traverse speeds (feed rates) are tested to look for constancy of result. For example, if the same results are obtained at feed rates of 1,000 millimeters/minute {mm/min}, and 2,000 mm/mm, one can have fair confidence in the accuracy of these results. Thus the tuning method of one embodiment of the present invention involves a very small non-zero $K_v$, and translational motion sufficient to avoid stopping the platform when random noise is superimposed in the process of making the FRF measurements. However, these two processes are not completely compatible. In order to achieve adequate translational motion of the platform, reasonably large command velocity signals must be delivered to the controller. However, for very small $K_v$ values, a very large error signal, 32, must be present to produce the required translation of the platform. Thus, small $K_v$ and reasonably large translational motion are at cross-purposes. This basic incompatibility is reconciled by means of velocity feedforward.

Feedforward capabilities are often included in machine tool position controllers and can be employed according to the techniques of the present invention to facilitate tuning. This is indicated in the control diagram of FIG. 5 by the addition of feedforward path blocks 34 and 35. The necessity for velocity feedforward is due to the very low gain in 27 leading to a nearly open position loop. Velocity feedforward is effected by tapping into signal 31 which is a position command signal, directing this signal via 36 to element 34. To achieve the desired velocity feedforward, block 34 computes the time derivative of the position leading to velocity. Block 35 provides a control for the percent of the velocity signal that is fed forward to summing junction 37. In the preferred embodiment of the present invention, block 35 is set for 100% velocity feedforward. That is, 100% velocity feedforward for tuning but not necessarily in actual operation of the machine. Summing junction 37 then combines this feedforward velocity with the velocity command emanating from 27. This use of 100% velocity feedforward allows both reasonable feed rates for the platform being tuned by the present invention, as well as a nearly open position loop by use of a very small value of $K_v$.

The fundamental approach underlying the preferred tuning techniques of the present invention is to tune the control loops under conditions as stringent as those ever likely to be encountered in practice, whenever feasible. One such effect is the total inertia of the system. The mass of the workpiece to be processed is clearly variable. Therefore, tuning the velocity control loop needs to be performed under conditions more stringent than those to be encountered in practice. For the low frequency portion of the FRF, higher inertia will increase the measured gain margins of stability. Although increased inertia has numerous interconnected effects on the performance of the system, the first order effect of increased inertia is to reduce the amplitude throughout the entire range. This increases gain margin since the amplitude is lower but the point where the phase is ±180 degrees does not change. Thus, taking the measurement with the table (or platform) unloaded gives the most stringent conditions for the lower frequency portions of the FRF (the "full traverse" measurement defined below). The effect on phase margin is more complex. With an integrator in the system (the "I" of the PI compensator), the effect may be to decrease the phase margin. This results from the typical low frequency behavior of a system with a PI compensator where the phase component of the open loop FRF often increases with frequency. Thus a reduction in amplitude causes the 0 dB frequency to be lowered and the phase at this frequency is lower than that of the previous frequency. Thus adding massive workpieces may reduce the phase margin of stability in certain cases. However, in many cases this effect is counteracted by the increased bearing forces resulting from the increased load. The increased bearing forces can result in an increased level of viscous friction, which itself results in increased phase in the low frequency range, thus countering the effect of the lower frequency 0 dB amplitude crossing point. Fully loaded tables may also affect mechanical resonances. It is the experience of the inventor, however, that only low frequency resonances are affected when a massive workpiece is placed on the table, having no serious affect on the higher frequency resonances determined by the techniques of the present invention. However, for a typical commodity machine tool, putting a full load on the platform may increase the total inertial by (typically) no more than 20%. Using the phase margin guidelines herein will nevertheless provide adequate margins of stability in practice. Practical experience indicates that full loads do not introduce tuning problems if tuning with no load (empty platform) according to the procedures of the present invention are carried out.

As noted above, the FRF measurements are preferably made with the platform in motion, but not in too rapid motion such that only a limited number of measurements may be performed during the full traverse of the platform. It is also preferred that the FRF's used in tuning pursuant to the present invention are constructed from multiple FRF's averaged to produce the net FRF. The FRF's according to this embodiment of the present invention can be computed in a series of sequential windows in time. That is, random noise excitation is applied to the system. The response of the system during a specified time interval is extracted and converted to a frequency response function by Fourier transforming the time behavior extracted from that particular time window. Signal analyzers commercially available are suitable for this purpose. Thus, each time window leads to a complete FRF. The FRF's from each sequential time window can then be averaged to produce the net FRF. (Dynamic signal analyzers typically produce the averaged FRF from averaged autospectra for input and output and cross spectra of input times output for each time window. Techniques to optimize the estimate for the FRF based on knowledge of noise sources are available in the scientific literature in the field of signal analysis). If the traverse is too rapid there will be few time windows to analyze leading to inferior results. The duration of the time window is determined by the total frequency range over which measurements are desired (typically 0 to 1 kHz) and the frequency resolution desired. Longer time windows lead to better frequency resolution on the FRF. Poor resolution may cause features in the FRF to be distorted. Thus, slower traverse of the platform leads to many time windows and hence better averaging of spurious noise in the final result and better frequency resolution.

The preferred tuning technique also makes use of several types of FRF measurement that are piecewise matched to produce the FRF useful in tuning the velocity control loop. As noted, measurements are made with the platform in motion under conditions away from the stabilizing effects of non-linear friction, typically avoiding stoppage of the platform at any time during the traverse. Such measurements are typically made for the platform moving over the entire length of its traverse, repeated typically several times for obtaining numerous FRF measurements. Making such measurements many times and averaging the results are also included within the scope of the present invention. This first form of FRF measurement will be denoted herein as "full traverse."

A second set of measurements is also preferably used to produce FRF's. These measurements have the platform moving over a either the full range or a limited range of traverse but going back and forth over whichever range many times during the course of the measurement. Numerous FRF's are determined and averaged to produce a net FRF from this type of platform motion. These measurements are referred to herein as "repetitive", indicating many repetitions of the same motion. Under such conditions it is expected that the stopping and restarting of the motion of the platform will introduce low frequency components into the FRF that are an artifact of the particular motion and not to be included in the tuning of the control loop. Thus the repetitive FRF's are understood to be inaccurate at lower frequencies and not to be used in those ranges. The full traverse measurements are more reliable at low frequencies. In addition, these repetitive measurements are typically performed at higher feed rates than full traverse determination.

The FRF determinations so far have assumed that the response of the system is the same for any location of the platform along its traverse. This may not necessarily be the case. There may be particular locations for the platform along its traverse that are lightly damped or naturally less stable than others. Such effects are also investigated and taken into account in the practice of the present invention. Typically, in a ballscrew driven axis, the platform or ball nut being close to the drive motor tends to cause high frequency resonances associated with the motor or coupling to achieve its most lightly damped condition. It is observed in practice that the mechanical resonance at 21 in FIG. 3 may increase when the platform is close to the drive motor. The detailed explanation for these dynamical effects is not precisely determined. However, the different transmission characteristics of different lengths of ballscrew are plausibly related to the observed characteristics. When the platform is close to the drive, a shorter length of ballscrew lies between the drive motor and the platform to be moved. Thus, mechanical compliances affecting the transmission of various frequencies along the ballscrew will differ by means of having different lengths to travel in reaching the platform. It is theorized that this occurs because the total inertia is coupled to the motor with the stiffest torque/force transmission elements in this configuration. The stiff drive train causes a maximum of energy to be concentrated at the high frequency resonance. In other circumstances, where there is a larger exposed ballscrew and reduced stiffness, medium frequency resonances associated with the ballscrew absorb a larger portion of energy and de-couple a portion of the total inertia from the apparent load of the mechanical element associated with the high frequency resonance. The apparent load inertia of the element whose compliance causes the high frequency resonance is highest when the drive train is stiffest—which occurs when the ballnut is closest to the coupling and there is the shortest length of exposed ballscrew between the motor and load. Increases in the apparent load inertia result in decreased damping because the anti-resonance and resonance associated with this mode of vibration are separated by a larger change in frequency. The increase in frequency separation between the resonance and anti-resonance results in a reduction of the cancellation of the resonance by the anti-resonance and a higher amplitude sharper resonance peak. Yet another type of FRF determination is also preferably performed. This measurement is done over a very limited range of traverse but at various positions along the full traverse of which the platform is capable. The most stringent test is usually, but not always, when the platform is close to the drive motor. This is the case to be investigated first but other locations should also be tested to be thorough. This third class of FRF determination is referred to herein as "location-dependent." In practice, FRF's are determined at each of several different locations, typically three, are tested. The three locations recommended for testing are the two extremes of axis travel and the center of axis travel. The worst-case effects of the location nearest the motor have already been discussed. For ballscrews that are pre-tensioned, the location at the center of travel is the location of maximum ballscrew axial compliance. The maximum ballscrew axial compliance represents the case where the medium frequency resonance associated with the ballscrew axial compliance will be of largest amplitude. This location represents a possible worst case condition over the medium frequency range. The location of maximum displacement of the ballnut from the motor is the location where the ballscrew torsional compliance is maximum. It is also the location where the ballscrew axial compliance is maximum for machines with unstretched ballscrews. This location also has the potential to provide a worst case condition in the medium frequency range.

Thus, according to one embodiment of the present invention, three types of FRF's are determined: full traverse, repetitive and location-dependent The tuning method of this embodiment of the present invention uses a piecewise fit of these three forms of FRF measurement to extract the FRF from which stability, gain and phase margins of stability are determined. It is preferred that these different measurements are used over different frequency ranges as follows:

Low Frequency: For the low frequency portion of the FRF the full traverse FRF's are employed since minimal corruption of the low frequency portion of this curve is anticipated.

Intermediate Frequency: For intermediate frequencies either the repetitive FRF or a location dependent FRF that exhibits a worst case result in a medium frequency range is used. The worst case is defined by the measurement that has the lowest gain and phase margin or the highest amplitude resonance. Judgement of the setup technician is sometimes required to determine which measurement represents the worst case.

High Frequency: For high frequencies the location-dependent FRF that contains a maximum amplitude resonance over the high frequency range is used. If several location-dependent FRF's have equal amplitude high frequency resonances, the one yielding the smallest gain and/or phase margins of stability should be used.

The piecewise fitting of various FRF's are most conveniently performed by a software system in which the technician may adjust the frequency ranges over which various FRF's defined above. The preferred option is to use the low, intermediate and high frequency ranges as defined above. The user may omit one or more of the FRF's and extend those from adjacent frequency regions to cover the entire frequency spectrum of interest. However, the order low, intermediate, high connecting with full traverse, repetitive and location-dependent should not be interchanged since this ordering is known according to the present invention to be the relative ranges of applicability.

Once the FRF's have been taken, this embodiment of the invention computationally removes the effect of the existing compensator and other control loop circuit elements and the particular choice of parameters that were used to control the axis during the measurement of the FRF's. Having computationally extracted the effects of one set of parameters, the techniques according to the present invention substitute different parameters that will lead to improved performance of the control loop. That is, according to this aspect of the invention, computational methods are provided which permit one to tune the control loop by means of off-line, computational selection of the PI compensator and other circuit parameters as such are tunable by the technician. This is most conveniently done by means of a computer system having a graphical user interface (GUI) software tool for visualization by the technician. The software tool first removes the effects of the existing compensator (that is, the particular parameters of the compensator under which the FRF's were experimentally determined). The software tool then replaces the effects of the existing compensator and replaces with revised parameters, the effect of which on gain and phase margins can readily be seen graphically by the technician. This is most conveniently seen in transfer function notation. Denoting by g(s) the open loop transfer function describing the composite dynamics of the several mechanical, electrical and computer systems, g(s) can be decomposed as follows:

$$g(s)=D(s)R(s) \qquad \text{Eq. 7}$$

Where transfer function D(s) describes the dynamics of the velocity loop compensator. Transfer function R(s) describes the dynamics of the current/torque control loop, mechanical load, position/velocity sensor and any feedback path compensation.

The effects of the existing compensator in the real frequency domain, denoted as $D_{old}(\omega)$, are removed by multiplying the open loop frequency response function by the inverse of the frequency response function for the compensator as derived from the compensator parameters which were active and present in the velocity control loop during the measurement the proposed compensator, $D_{new}(\omega)$ is introduced into the system by multiplying the frequency response function for the compensator as derived from the proposed compensator values as provided as input to the computer system by the technician.

$$g_{new}(\omega) = \frac{D_{new}(\omega) g(\omega)}{D_{old}(\omega)} \quad \text{Eq. 8}$$

The response predicted for the closed loop FRF when the proposed parameters are applied to the velocity control loop is then obtained from the relationship between open loop and closed loop transfer functions as $$H_{new}(\omega) = g_{new}(\omega)/[1 + g_{new}(\omega)] \quad \text{Eq. 9}$$

The compensator frequency responses may be synthesized in this manner regardless of whether the compensator is analog or digital. Also, a variety of filter configurations can be accommodated.

In particular, an analog compensator is often implemented as an electronic circuit comprised of resistors, capacitors, and op-amps. In this case, the parameters of the compensator transfer function are derived from the values of the hardware elements in the circuit. A general description for an analog compensator is given below. The coefficients of s: $b_k$ and $a_k$ are real-valued numbers that are derived directly from the values of the resistors and capacitors.

$$D(s) = \frac{b_n s^n + b_{n-1} s^{n-1} + \ldots + b_2 s^2 + b_1 s + b_0}{a_m s^m + a_{m-1} s^{m-1} + \ldots + a_2 s^2 + a_1 s + a_0}, \quad \text{Eq. 10}$$

$$m \geq n$$

For the specific case of a PI (proportional+integral) compensator the transfer function is the following, where $k_P$ and $k_I$ are derived from the values of the resistors and capacitors in a single op-amp circuit.

$$D(s) = \frac{k_P(s + k_I)}{s} \quad \text{Eq. 11}$$

For the specific case of a PI compensator cascaded with two first order low-pass filters with cutoff frequencies $\omega_1$ and $\omega_2$, the following transfer function applies. In this case, two op amps are employed and $\omega_1$ and $\omega_2$ are functions of the resistors and capacitors in the second op-amp.

$$D(s) = \frac{k_P(s + k_I)}{s} \frac{\omega_1}{s + \omega_1} \frac{\omega_2}{s + \omega_2} \quad \text{Eq. 12}$$

Of course, there are many other potential compensators which may be implemented as analog circuits, but for all compensators that have the property of linearity, the general equation provided above may be employed. The frequency response of a linear analog compensator where the parameters $b_k$ and $a_k$ are known, can be synthesized by evaluating the function at every frequency in the original frequency response measurement of the system represented by the variable $f_i$ which has units of Hertz. The equation is evaluated on a digital computer using the rules for arithmetic operations on ordered-pair complex numbers.

$$D(\omega_i) = \frac{b_n(2\pi f_i \cdot j)^n + b_{n-1}(2\pi f_i \cdot j)^{n-1} + \ldots + b_2(2\pi f_i \cdot j)^2 + b_1(2\pi f_i \cdot j) + b_0}{a_m(2\pi f_i \cdot j)^m + a_{m-1}(2\pi f_i \cdot j)^{m-1} + \ldots + a_2(2\pi f_i \cdot j)^2 + a_1(2\pi f_i \cdot j) + a_0} \quad \text{Eq. 13}$$

If the compensator is implemented as a causal linear discrete-time filter on a sampled-time system such as a digital computer, then it will inevitably be possible to represent the filter with the following z-domain transfer function, where z represents the unit forward time shift operator. The b and a are the digital filter coefficients that are real numbers whose values are known precisely and exactly. The b and a coefficients are not the same as those for an equivalent continuous-time transfer function $$D(z) = \frac{b_n z^n + b_{n-1} z^{n-1} + \ldots + b_2 z^2 + b_1 z + b_0}{a_m z^m + a_{m-1} z^{m-1} + \ldots + a_2 z^2 + a_1 z + a_0}, \quad \text{Eq. 14}$$

$$m \geq n$$

For the case of a discrete-time PI compensator cascaded with two low pass filters, the z-domain transfer function may take on the following form, where T is the sampling interval in seconds $$D(z) = \frac{k_p(1 - z^{-1} + k_1 T)}{(1 - z^{-1})} \frac{\omega_1 T}{(1 - z^{-1} + \omega_1 T)} \frac{\omega_2 T}{(1 - z^{-1} + \omega_2 T)} \quad \text{Eq. 15}$$

The frequency response of the general discrete-time compensator is derived for each frequency in the frequency response measurement to be acted on. This is done by using the following relationship between z and s.

$$z = e^{sT} => D(\omega) = D(z = e^{sT})|_{s = j\omega} \quad \text{Eq. 16}$$

The frequency response of the discrete-time compensator is then synthesized as follows.

$$D(\omega_i) = \frac{b_n \cdot e^{2\pi f_i \cdot j \cdot n \cdot T} + b_{n-1} \cdot e^{2\pi f_i \cdot j \cdot (n-1) \cdot T} + \ldots + b_2 \cdot e^{2\pi f_i \cdot j \cdot 2 \cdot T} + b_1 \cdot e^{2\pi f_i \cdot j \cdot 1 \cdot T} + b_0}{a_m \cdot e^{2\pi f_i \cdot j \cdot m \cdot T} + a_{m-1} \cdot e^{2\pi f_i \cdot j \cdot (m-1) \cdot T} + \ldots + a_2 \cdot e^{2\pi f_i \cdot j \cdot 2 \cdot T} + a_1 \cdot e^{2\pi f_i \cdot j \cdot 1 \cdot T} + a_0} \quad \text{Eq. 17}$$

The previous equation is evaluated on a digital computer be evaluating the complex exponentials using Eulers relation and representing the resulting complex number an ordered pair. Rules for arithmetic operations on ordered pairs are then employed to evaluate the rational function.

The velocity compensator frequency response $D(\omega)$ for the specific type of compensator is then used for $D_{old}$ or $D_{new}$ in the above equations. In particular, the effects of proposed changes in parameters can be simulated by removing (from the measured frequency response) the effects of the existing compensator and its parameters $D_{old}$ and adding the effects of the newly proposed compensator $D_{new}$.

Accordingly, in one preferred embodiment of the present invention, multiple FRF's are taken over the frequency range of interest. The measurements are taken using a plurality of axis movement ranges and locations. Thus, it can be ensured that the most stringent operating conditions are tested. The multiple FRF's are then fitted together to form one function that represents the worst case operating point for the axis dynamics. The effects of the existing compensator are then computationally removed from the data, so as to remove the effects of the control parameters which controlled the motion. Then, using this data, the user can propose new control parameters to increase the quality of the frequency response measurement. The effects of these parameters can then be simulated "off-line", and additional adjustments made if needed. Thus, the proposed velocity loop compensator gains can be chosen based on their impact on the system open and closed loop responses, gain-margin, phase-margin, and bandwidth. Accordingly, this embodiment of the invention does not require mathematical models to be assumed regarding the system, thereby eliminating the inaccuracies and other problems which can be inherent in such models. Moreover, the embodiment eliminates the cumbersome, subjective, and problematic "trial and error" method of parameter tuning.

FIG. 6 (starting at FIG. 6A and continuing through FIG. 6D) is a flow chart illustrating one preferred mode of operation of the tuning method and apparatus of the present invention. At step 210, the position error gain $K_V$ is set to about 1% of its normal value, i.e., the value that it will usually be set during control of the motion. (If the normal operating value is, for example, Kv=1.5, it is re-adjusted to be Kv=0.015 at step 210.). Then, the velocity feedforward value is set to 100%. With reference to the embodiment of FIG. 5, the gain $K_V$ can be set by changing the amplification value of block 27, and the feedforward percentage can be set by changing the feedforward value of block 35. By setting the gain $K_V$ at about 1%, or a similar low value, the control system is nearly open loop with respect to position control; the velocity loop 26 remains closed however, and using feedforward allows for reasonable feedrates to be achieved. Once these parameters are set, the axis can be placed into motion at a chosen feedrate (i.e., velocity) by applying a velocity command that corresponds to this chosen feedrate. The chosen feedrate is expected to depend on the class of axis. For example experience has shown that a recommended initial feedrate for a ballscrew driven axis with linear guideways is 1500 mm/min. Appropriate initial feedrates may be established for a class of axis as the minimum feedrate that generates results from FRF measurements that indicate the worst (least stable) case. The appropriate feedrate for a class of axis can be determined experimentally in advance by executing all steps in the flowchart in FIG. 6 at multiple feedrates. The expected trend is that mechanical resonances evident in the amplitude plot and phase lags evident in the phase plot become larger with larger feedrate. For ever increasing feedrates, the feedrate at which resonance amplitudes and phase lags no longer increase with further increases in feedrate is the lowest feedrate that represents a worst case condition for an axis type and represents a good value for initial feedrate.

Figure 5:
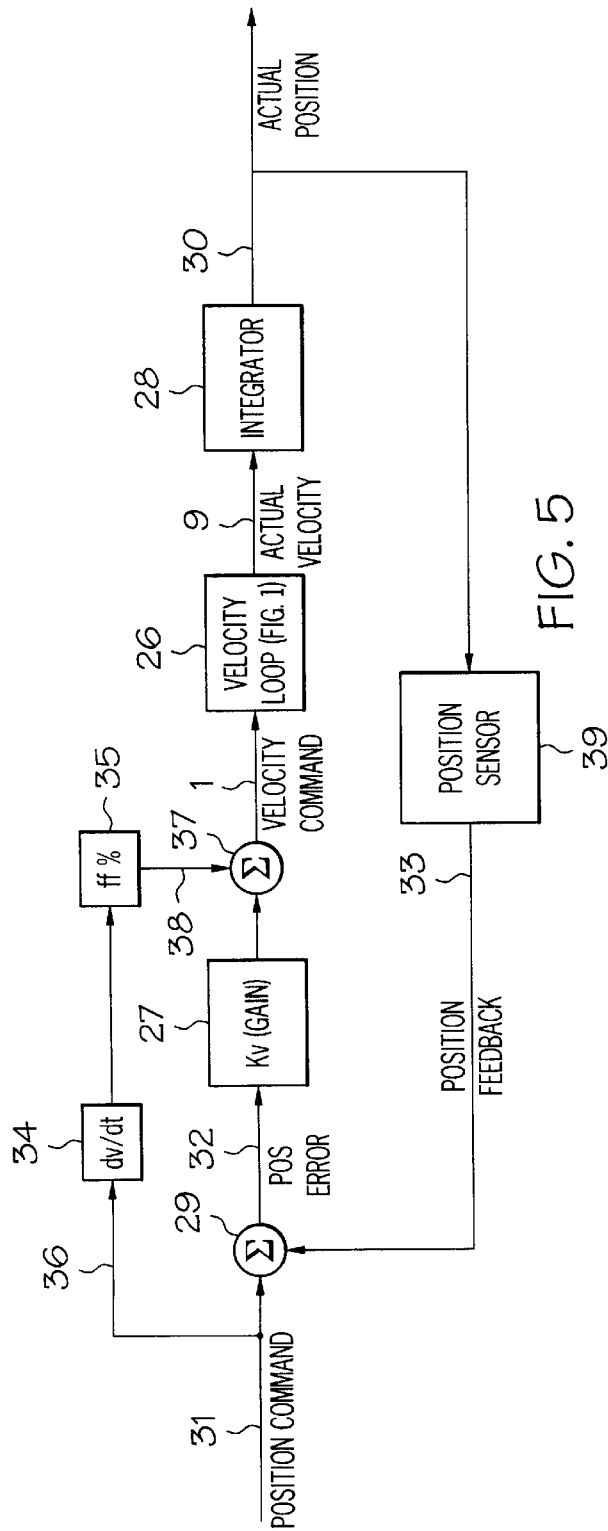
FIG. 5 is a control block diagram such as that of FIG. 4, but including feedforward capability.
Figure 6A:
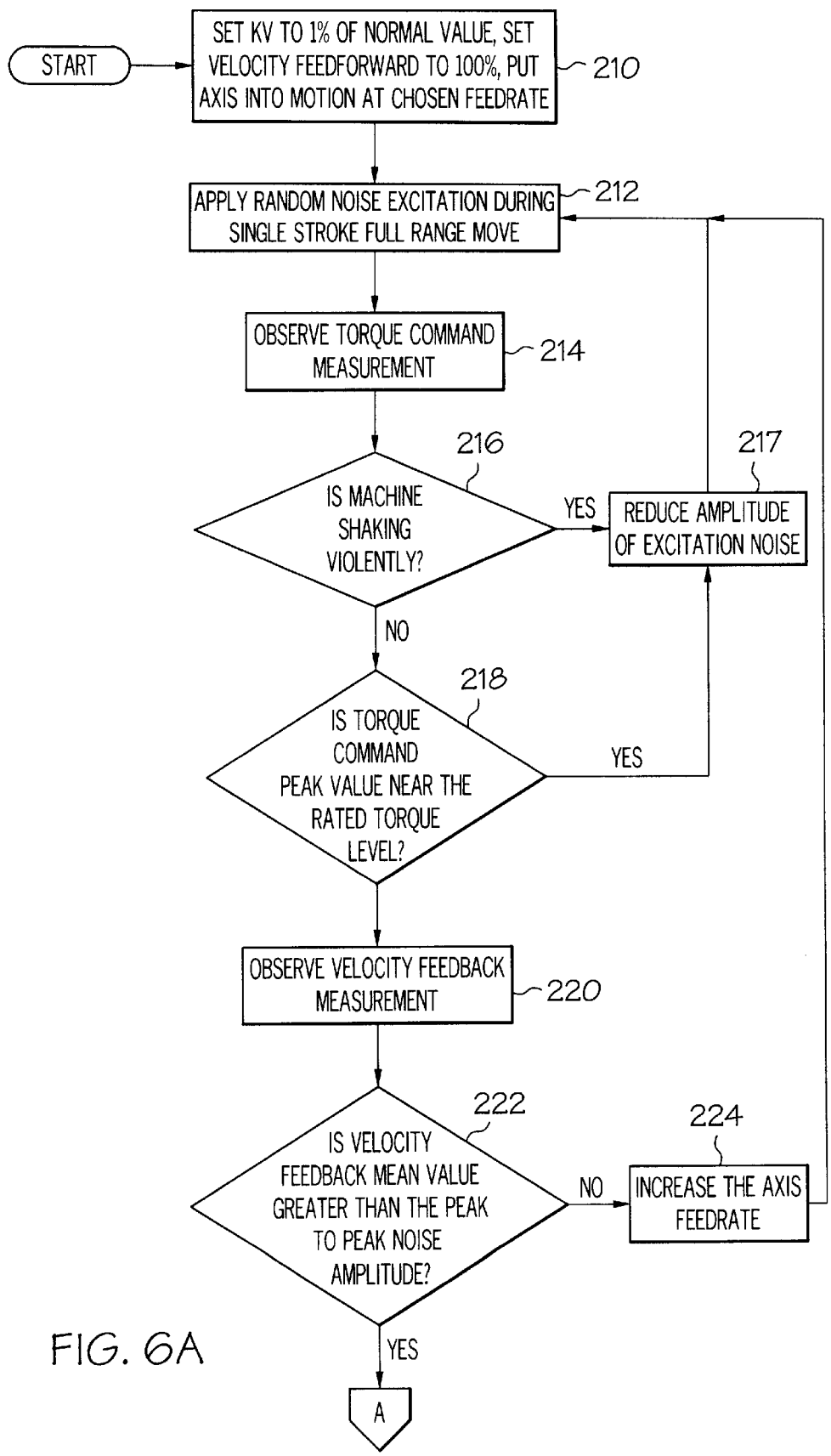
FIGS. 6A–6D, is a flow chart illustrating a method for tuning compensator parameters, according to one embodiment of the present invention.
Figure 6B:
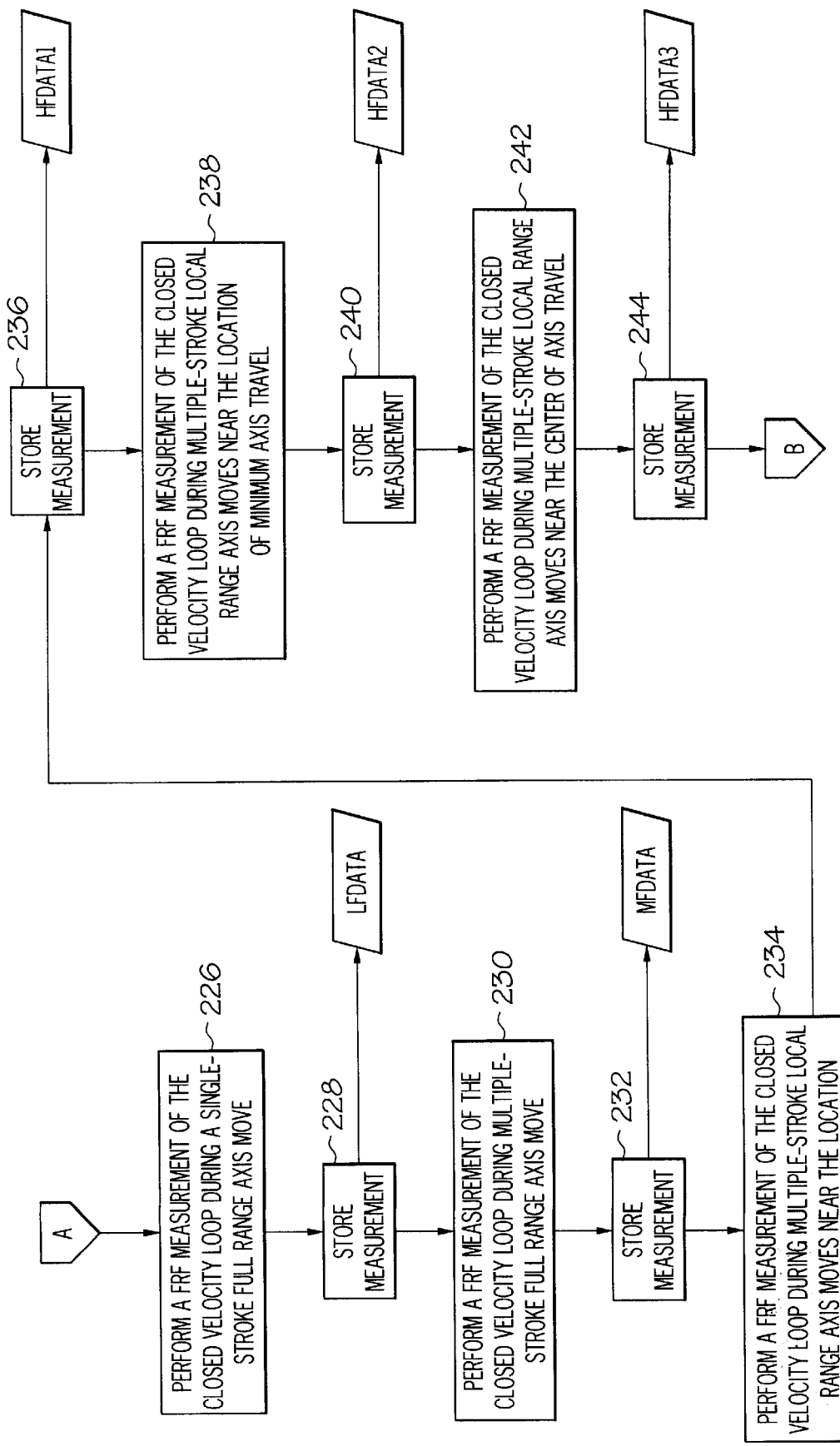
Figure 6C:
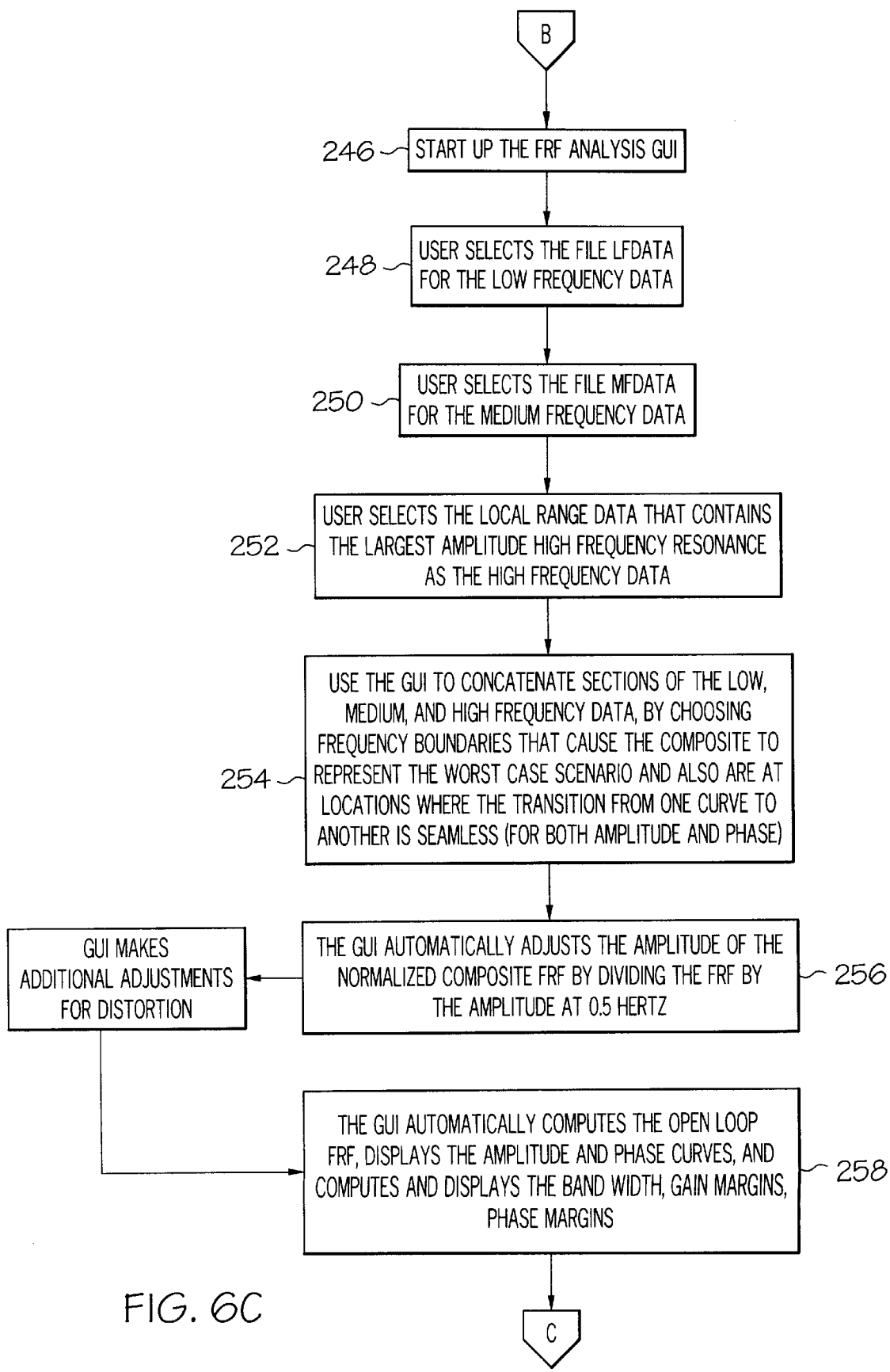
Figure 6D:
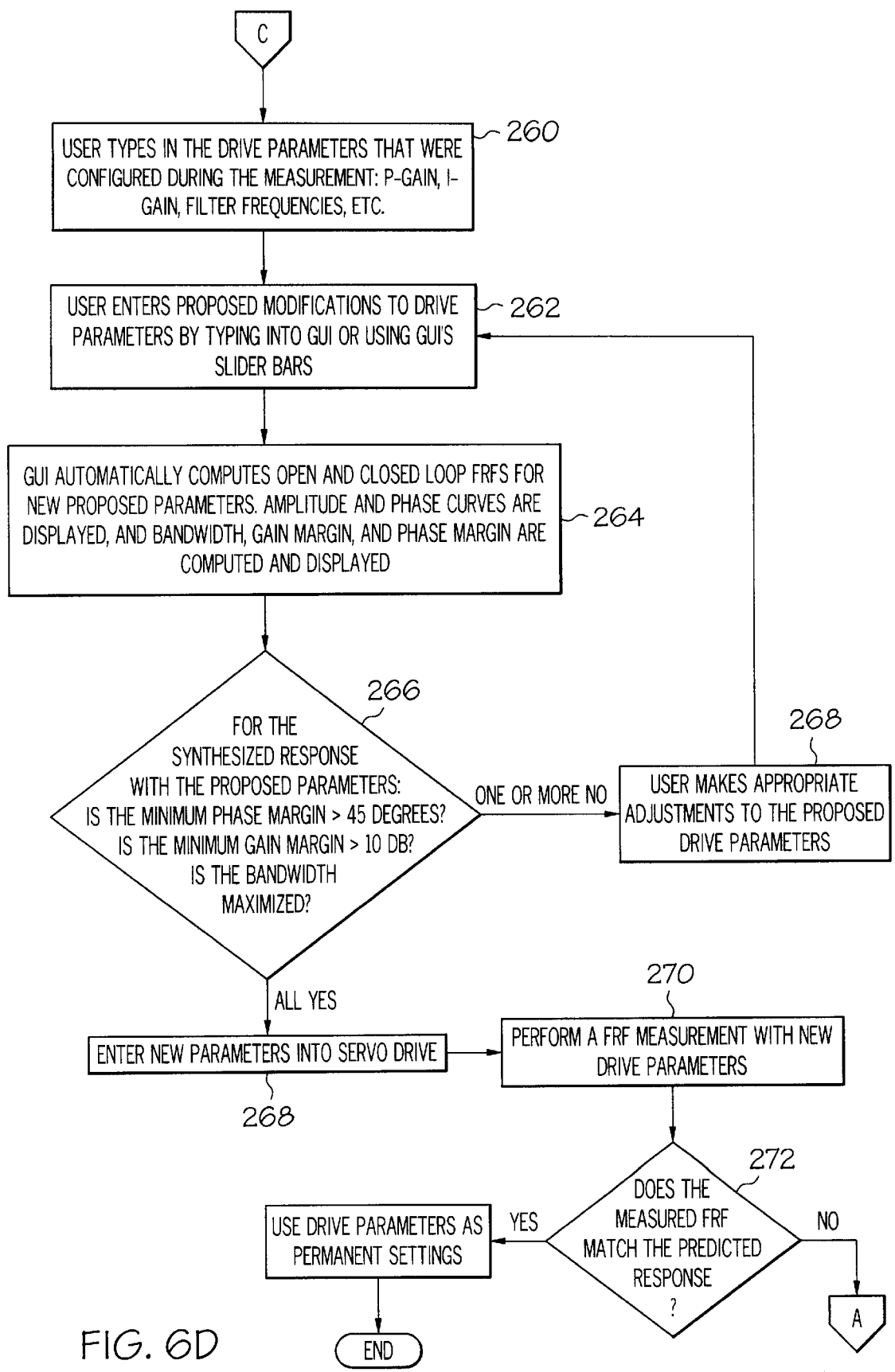

Then, at step 212, a random noise signal containing evenly distributed energy over the frequency bandwidth of interest is applied in addition to the chosen velocity command signal at the drive's velocity command input, such as by providing the noise signal as an input to summing block 37 of FIG. 5. The random noise signal can be created by any function generation instrument capable of creating so called "whitenoise," "pink noise," or band-limited white noise signals. It is preferred that the noise is uniformly distributed in amplitude, but normally distributed noise also is acceptable. This noise is applied during a single stroke (either forward or reverse) motion of the axis and during a full range move (from minimum possible position to maximum possible position) of the axis. The noise level is chosen subjectively to be at a level below the level which causes the axis to vibrate too severely as described below.

At step 214, the torque commands delivered to the motor during this motion are measured. In practice, this signal is either made available as an analog test point on the axis drive or provided by the drive as a digital signal or data set. Then, at step 216, it is determined whether the machine is shaking violently. This determination may be subject to the opinion of the user, but the point of this step is to avoid noise levels that appear to be so large that permanent damage to the axis mechanism may result.) If so, then, at step 217, the amplitude of the random noise signal is reduced, such as by lowering the amplitude setting on the signal generator, and the process is re-started at step 212. (An appropriate starting value for the random noise level is a level that is half of the level (RMS amplitude) where the machine is considered to be shaking violently.) If the machine is not shaking violently, then step 218 is executed, and it is determined, from the torque command measurements, whether the torque command peak amplitude is greater than the rated torque level for the motor. (The rated torque level is typically included as a specification with a motor.) If so, then this indicates that the noise signal should be reduced, at step 217, and the process restarted at step 212.

If the machine is not shaking violently, and the torque command is not greater than the rated torque level, then the process continues to step 220, wherein the velocity feedback is measured and observed. The feedback velocity must represent the feedback velocity used by the drive to compute the velocity error. This signal is provided by the drive for external measurement either as an analog test point on the drive or as a digital signal or data set. The mean value of these velocity feedback measurements is then calculated, and it is determined, at step 222, whether this mean value is greater than the peak to peak amplitude of the random noise component of the velocity feedback signal. If not, then the axis feedrate is too low, and a higher feedrate selected. This is shown at step 224.

If the mean value is greater than the peak to peak amplitude of the noise component of the velocity feedback signal, then step 226 is executed, and a FRF measurement is taken using the chosen feedrate and the applied random noise signal. Such a measurement would include the amplitude and phase response of the output to the input of the control system across a range of frequencies, as is shown in FIG. 3. As known in the art, signal analysis hardware and software can be utilized for taking such measurements and creating such graphs. The FRF data for this particular single stroke full range axis movement is then recorded in memory, at step 228, and is referred to herein as LFData.

As noted above, according to one aspect of the present invention, the axis is moved in a number of ways, so as to simulate the most stringent operating conditions of the axis. Accordingly, at step 230, an FRF measurement is taken of the closed velocity control loop during a multiple-stroke (a plurality of back and forth motions) full-range (minimum to maximum position) axis movement. This is accomplished by providing appropriate velocity commands which will achieve such motion. Again, during this motion, a random noise excitation signal is applied to the control system by summing the noise with the constant velocity command and applying the signal to the drive's velocity control input, while the FRF measurements are taken. The FRF data is then stored at step 232, and the data is referred to as MFData. The process is then repeated for a multiple-stroke, limited-range axis movement, at step 234, where the axis is moved back and forth locally near the maximum axis position. The stroke should be long enough to allow the axis to reach constant velocity for at least half of the move. Once again, the FRF data for this type of motion is taken using a random noise excitation signal applied to the drive's velocity command input. This data is referred to herein as HFData1, and is stored at step 236. Then, an FRF measurement using another random frequency excitation signal is taken, at step 238. At this step, a multiple-stroke movement is made for a limited range of motion near the minimum axis position; in other words, the axis is moved back and forth near the minimum axis position during the FRF measurement. The data is then stored at step 240 and is referred to herein as HFData2. A final FRF measurement is then made during a multiple-stroke movement near the center of the axis travel path, and this data is stored as HFData3. These steps are shown at blocks 242 and 244. In all limited stroke cases, the length of stroke should be long enough to allow the axis to accelerate to constant velocity for at least half the length of stroke.

Once all of the FRF measurements are taken and stored for these separate extreme operating conditions, the data can be analyzed and combined to obtain a single FRF function which represents the frequency response function for the most stringent machine conditions. These steps are shown as blocks 246, 248, 250, 252, and 254, and can be accomplished using computer software having a graphical user interface (GUI), made in accordance with one aspect of this invention, and described in further detail below. At step 246, the GUI is executed, and the stored LFData file is selected at step 248 and displayed. This data will be used for the low frequency data of the composite FRF. Then, the user selects the MFData and displays it on the GUI, at step 250. This data will be used for the medium frequency portion of the composite plot as it represents the average behavior over the full travel of the machine. The MFData is used because it is a cleaner more reliable signal than the LFData as it is established more data sets than the LFData. To select the data for the high frequency portion of the composition FRF, the user selects the local range data file (HFData1, HFData2, or HFData3), taken during steps 234–244, which contains the highest amplitude high frequency resonance. This step is shown at block 252.

Once the three FRF's are selected, the user can select portions of these plots to make up the one composite FRF. This is preferably conducted by choosing the two frequency boundaries between the three plots such that the composite has the worst case gain margin, bandwidth, and phase margin, and also such that the transition from one curve to the next is seamless (continuous) for both the amplitude and phase plots. This step is shown as step 254.

Once the composite FRF is established, the GUI program automatically adjusts the amplitude of the composite FRF by dividing the FRF by the amplitude value at 0.5 Hertz. This is done to correct for scaling differences between the velocity command and velocity feedback signals provided by the drive. This is shown at block 256 of FIG. 6.

At step 257 the GUI software tool, if necessary, makes additional adjustments to the measured closed loop FRF to account for any known amplitude and phase distortion created by the drive in its generation of the velocity feedback signal that is used to create the FRF. This is typically only required for drives that provide only a single test point that is typically configurable to provide an analog representation of either velocity command, velocity feedback, or torque command. In this case, the test point is used to measure velocity feedback and the velocity command signal required for the FRF is provided by direct measurement of the random noise offset to the velocity command input. Typically, the test point signal is distorted relative to internal signals independent of which internal signal is applied to the test point. Thus, if a drive provides two test points, allowing for simultaneous measurement of velocity command and velocity feedback, both signals are distorted equally and an adjustment to the FRF is unnecessary. Conversely, if only one test point is available the velocity feedback could be distorted relative to the velocity command. For example, the analog velocity test point provided by a drive may differ from the velocity feedback used internally by the drive in its control law. Some drives apply low pass filters (analog or digital) to the velocity signal before making it available to an analog test but do not apply the same filters to the velocity feedback used in the control law. In addition, there may be a time delay between the time the drive responds to a particular feedback velocity and the time it applies the feedback velocity to its test point. For analog test points in particular, the update rate of the test point and the effect of the zero order hold should be taken into account. The combination of these effects should be removed to recreate the velocity used by the control law. This is done by convolving the measured closed loop FRF H($\omega$) with the inverse of FRF of the drive's test point filter, time delays, and zero order hold B($\omega$). The result is the true closed velocity loop FRF H'($\omega$).

$$H'(\omega) = \frac{H(\omega)}{B(\omega)}$$

The FRF for the filter test point distortion B($\omega$) could be constructed based on knowledge of the filter order and cutoff frequency and is analogous to the construction of FRFs to account for compensator dynamics. The FRF for a time delay and zero order hold may also be constructed in such a way, the equations for which are well known and understood in the field of discrete time control. The specific information required for construction of the FRF to remove the phase and amplitude distortion may be obtained either by precise knowledge of the internal operation of the drive or by measurement. As an example, consider a digital drive that provides an analog representation of the velocity feedback at a test point where the signal at the test point is digitally low pass filtered version of the velocity feedback. Suppose the digital filter is composed of two cascaded low pass filters with cutoff frequencies at 400 Hertz and that the filtering operation causes the test point output to be delayed by a single 0.0005 servo tick. The FRF for the filtering effect of such a case is shown in the equations below. The equation also takes into account the effect of the zero order hold (ZOH) applied as part of the digital to analog conversion.

$$T = \text{ServoSampleRate} = 0.0005 \text{ sec}$$

$$z = e^{j\omega T} \quad \text{DELAY} = z^{-1} \quad \text{ZOH} = \frac{1 - z^{-1}}{T \cdot j\omega}$$

$$\text{FILTER} = \left(\frac{2\pi \cdot 400}{j\omega + 2\pi \cdot 400}\right)^2$$

$$B(\omega) = \text{DELAT} \cdot \text{ZOH} \cdot \text{FILTER}$$

In certain circumstances, the distortion of the test point signal relative to the velocity feedback signal used in the control law can be measured directly. For a drive that provides only a single test point that is configurable to represent either the command velocity or feedback velocity, a measured FRF from random noise input to the command velocity test point provides a direct measurement of B(ω)—the amplitude and phase distortion associated with the test point.

Then, at step 258, the program automatically computes the open loop FRF data from the composite FRF data, which is a closed loop FRF. This can be accomplished by using the known relationship between closed and open loop transfer functions, such as described with respect to Equation (1) above. Once this open loop FRF data is known, the program can display the amplitude and phase curves for this data, and calculate and display the bandwidth, gain margin, and phase margin from this data, as known in the art. These steps are shown at block 258. At step 260, the user then supplies, via the GUI, the drive parameters which were used to obtain the FRF measurements of steps 226, 230, 234, 238, and 244. The parameters depend on the type of compensator and filters used. For a PI compensator, the proportional and integral gains will be provided, and for a low-pass filter, the cutoff frequency for the filter will be provided. Using these parameters, the program can calculate the transfer function for this compensator/filter combination, such as by using an equation for the particular components used, such as one of equations 11, 12, 13, or 17 above.

Then, the user proposes new parameters for the drive by typing the parameters into the GUI, or by using other input mechanisms, such as slidebars for example by viewing their effects on the gain margin phase margin and bandwidth continuously updated by the GUI as the parameters are modified) This is shown at step 262. Using these proposed parameters, the program can automatically compute the open loop FRF's for these new parameters, such as by using equation 8 above. More specifically, the transfer functions for the old and new parameters can be calculated, and the open loop FRF is already known. Thus, the new open loop FRF can be calculated, in accordance with equation 8. Knowing the open loop FRF, the closed loop FRF for the new parameters can then be calculated, such as by using relationship between open and closed loop functions, as described with respect to equation 9 above. This simulation of the open and closed loop FRF's for the new parameters is shown at step 264 above. Knowing this new FRF data, amplitude and phase curves can be computed and displayed, as can bandwidth, gain margin, and phase margin. This is also shown at step 264.

Then, at step 266, the synthesized FRF's for the proposed parameters are analyzed for phase margin, gain margin, and bandwidth. It is preferred that the phase margin be greater than 45 degrees, that the gain margin be less than 10 dB, and that the bandwidth is maximized. If one or more of these has not been realized in the synthesized FRF, then the user makes adjustments to the proposed drive parameters at step 268, these adjusted parameters are entered at step 262, and the new FRF's are calculated and analyzed at steps 264 and 266.

Once the preferred FRF conditions are met, the method continues to step 268, and the new parameters (e.g., gains, cutoff frequencies) are entered into the servo drive mechanism, as known in the art. Then, an actual FRF measurement is taken using the new drive parameters. This measurement is taken by repeating steps 210 through 258 of the flowchart in FIG. 6 where the adjustments of steps 214–224 will likely be unnecessary. This is shown at step 270. This actual FRF is then compared to the previously synthesized FRF, at step 272. If there is a match between the two, then the proposed drive parameters are used as permanent settings, as shown at step 274, and the method ends. If there is not a sufficient match, then the process returns to step 226 where new FRF's are taken for the various preferred worst-case operating conditions. If the gain margin, phase margin, and bandwidth of the measurement match their predicted values within 20% or less than the results can be considered to adequately match the prediction.

Thus, the method of FIG. 6 does not rely on mathematical assumptions of the control system, but, rather, uses actual FRF's to determine the effects of proposed drive parameters, thereby avoiding the inaccuracies and inefficiencies inherent in such mathematical modeling. Moreover, according to this method, predicated or synthesized responses for the proposed parameters can be calculated and displayed, thereby avoiding the cumbersome and subjective trial-and-error technique of determining the actual system response of each proposed parameter set during operation.

Figure 7:
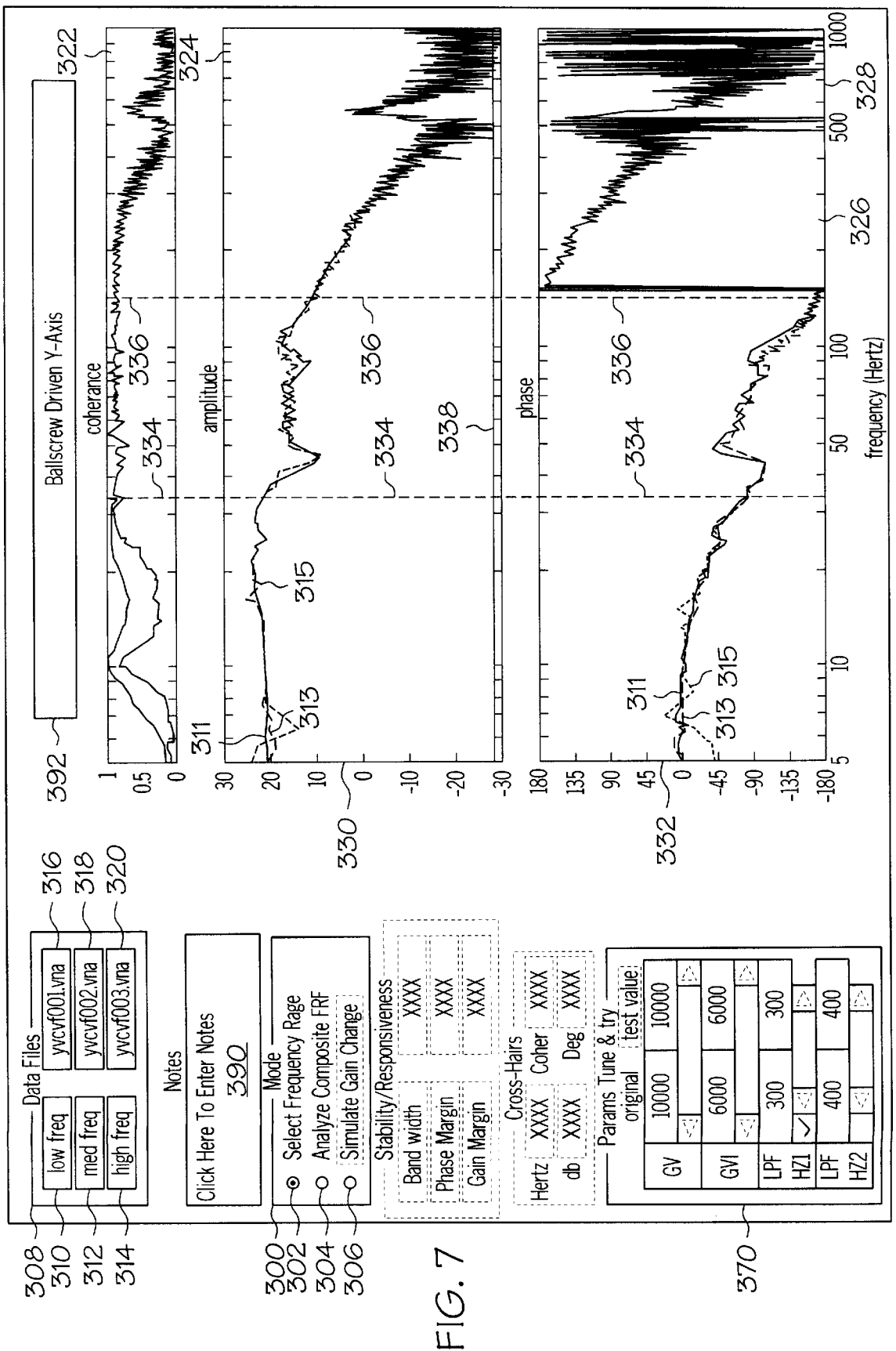
FIG. 7 depicts a user interface for displaying, viewing, and analyzing frequency response data for various motion types, and creating a composite frequency response, according to one embodiment of the present invention.
Figure 8:
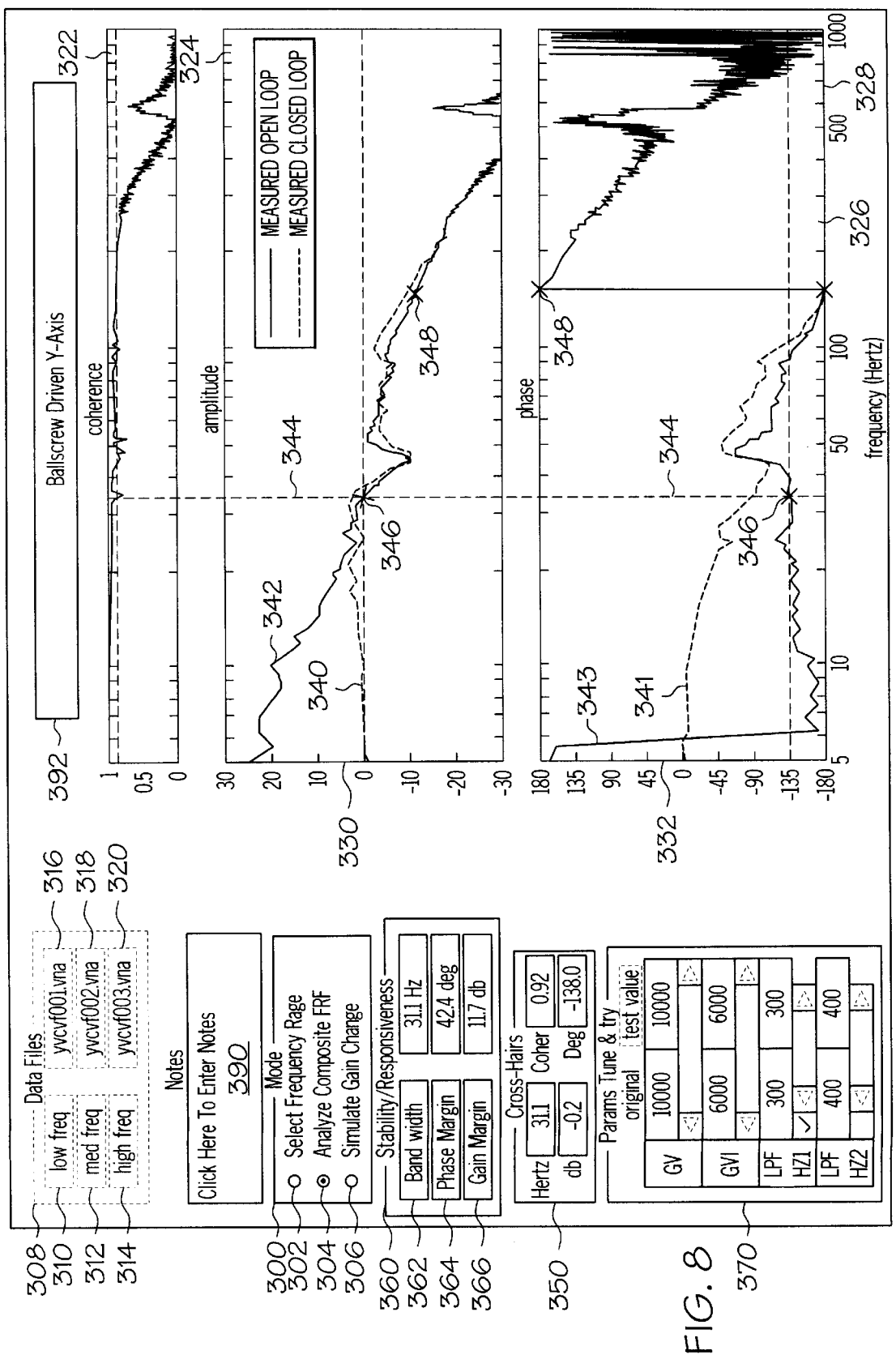
FIG. 8 depicts a user interface for displaying, viewing, and analyzing composite open and closed loop frequency responses, and their corresponding stability data, according to one embodiment of the present invention.
Figure 9:
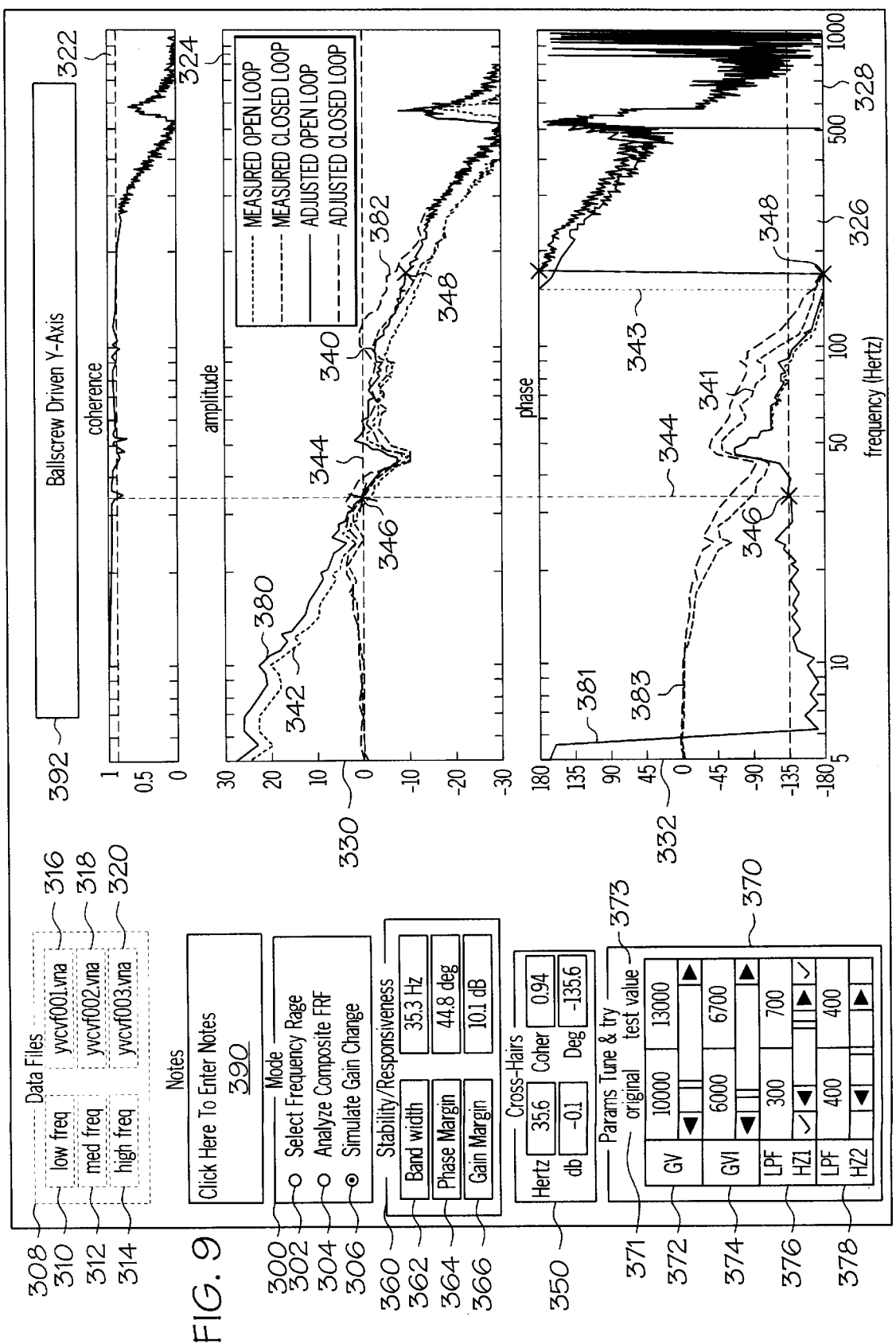
FIG. 9 depicts a user interface for proposing new control parameters, and for displaying, viewing, and analyzing simulated frequency responses, and their corresponding stability data, for the proposed parameters, according to one embodiment of the present invention.

FIGS. 7–9 illustrate preferred screen configurations for the GUI described above for analyzing frequency response function measurements of a machine tool axis drive's closed velocity loop, modifying control parameters based upon the FRF measurements, and simulating the response of the modified parameters.

As noted above, it is preferred that the GUI operates on three separate frequency response data files collected using signal analyzer data collection equipment. As also noted, it is preferred that these three data files are collected under slightly different axis operating conditions, and in such a way that the first data file provides the most accurate representation of the low frequency portion of the response, the second data file provides the most accurate representation of the least stable case medium frequency portion of the response, and the third data file provides the most accurate representation of the least stable case high frequency portion of the response. The preferred operating conditions for creating these data files are described above with respect to FIG. 6.

In general, this embodiment of the GUI has three separate operating and display modes, which are listed next to three buttons, 302, 304, and 306, in the "Mode" control box 300. The data source and frequency selection mode of this embodiment is shown in FIG. 7, the composite FRF analysis mode is shown in FIG. 8, and the parameter change simulation mode or "tuning" mode is shown in FIG. 9.

The "select frequency" button 302 is selected to specify the three files which, when combined, will create a single composite FRF for subsequent analysis. The files are preferably created using a system analyzer to take FRF measurements under various worst-case operating conditions, as described above.

FIG. 7 illustrates a mode of the GUI which allows for data source selection and frequency range selection. As shown in FIG. 7, the files can be selected using the "Data Files" box 308. To change the data file used for the low, medium, or high frequency portion of the composite FRF, the user selects the "Low Freq" button 310, the "Med Freq" button 312, or the "High Freq" button 314, respectively. Each of the buttons 310, 312, and 314 brings up a window for file browsing which allows the user to locate and select the appropriate file, as is known in the art. Next to each file browse button 310, 312, and 314, is an edit box 316, 318, and 320, respectively, which allows the user to change the name of the file by typing it in directly. The browse buttons 310, 312, and 314 can be used to change the path. Preferably, each file name is displayed with a different color in the edit box, and these colors match the three traces (graphs) displayed in each of the coherence graph box 320, the amplitude graph box 324, and the phase graph box 326. The frequency response data within each file should be obtained using identical settings on the signal analyzer for bandwidth and record length, as well as identical servocontroller parameters. Preferably, the bandwidth for the measurement is 1000 Hz.

Graphs of amplitude and phase for the FRF measurements contained in the three data files are displayed in each of boxes 324 and 326, the color of the graph indicating the file from which it was created. Accordingly, three graphs are shown in box 324 and three are shown in box 326, the graph 311 corresponding to the low frequency file 316, the graph 313 corresponding to the medium frequency file 318, and the graph 315 corresponding to the high frequency file 320. In this embodiment, the horizontal axis 328 for each of these plots is a log scale frequency in units of Hertz ranging from 5 to 1000 Hertz. In box 324, the vertical axis 330 is the amplitude component of the FRF data in units of decibels. In box 326, the vertical axis 332 is the phase component of the FRF data in units of degrees.

In addition, coherence graphs for each of the three files are provided in box 322. Coherence is an indicator of the believability of the data in boxes 324 and 326. When coherence is 1.0, it can be assumed that the amplitude and phase data accurately represent the system, However, when coherence is zero, no such assumption may be made and the amplitude and phase data may or may not accurately represent the system. The coherance function is typically calculated by the signal analyzer along with the FRF. If the coherance is not directly provided by the signal analyzer it can be computed from the autospectra of the input and output and the cross spectrum from input to output. Techniques for computing coherance as a function of frequency are well known in the field of signal processing. Each of the boxes 322, 324, and 326 include vertical lines 334 and 336, which are used to move the selectable boundaries which will delineate the frequency range for each file's contribution to the composite FRF to be created from the three files. The frequency range for each file's contribution to the composite FRF may be changed by the user by clicking and holding the left mouse button on one of the vertical lines 334 or 336 contained in each of the plots. Then, the line 324 or 326 may be dragged to the left or the right. Once the desired changes have been selected, the mouse button can be released, to establish the change. In this embodiment, when one of the vertical lines is dragged to within close proximity (e.g., 10 Hz) of the other vertical line, the second vertical line will also move when the first vertical line is continued to be dragged toward the second. A color bar 338 is also preferably provided to indicate the three frequency ranges delineated by the two vertical lines 334 and 336. A preferred method for selecting these three ranges is described above with respect to FIG. 6.

If the user desires to display data from just a single data file, this may be accomplished by entering the same name in the boxes 316, 318, and 320, and only this data will be used for the composite. Likewise, if the user desires to generate a composite from just two files, the same file name can be put in two of the boxes 316, 318, and 320, in accordance with which frequency range is to be selected from that file.

Once the file names have been entered in the boxes 316, 318, and 320, and the vertical lines 334 and 336 adjusted to indicate desired frequency ranges, the user may click on the "Analyze Composite FRF" button 304, to combine the data for the three ranges into one composite FRF. Accordingly, the GUI shifts into the mode of FIG. 8.

Upon entering the "Analyze Composite FRF" mode of FIG. 8, some additional controls are activated and the controls in the "Data Files" box 308 are disabled (and appear as being shaded). New coherence, amplitude, and phase graphs appear in boxes 322, 324, and 326. The coherence plot in box 322 of FIG. 8 contains the composite coherence constructed from the files and frequencies specified by the user while in the mode of FIG. 7. The amplitude and phase boxes 324 and 326 of FIG. 8 contain two traces each: a closed loop response 340 and 341, indicated by a dotted line and first color, and an open loop response 342 and 343, indicated by a solid line and second color. The files and frequencies selected in the previous mode (FIG. 7) are used to construct the data for the closed loop response graphs 340 and 341. More specifically, three sections of data from the graphs of FIG. 7 are concatenated to create the composite closed loop response 340 and 341 of FIG. 8: a) the data from the low frequency file listed in box 316 of FIG. 7 for the frequency range to the left of line 334, b) the data from the medium frequency file listed in box 318 for the frequency range between the lines 334 and 336, and c) the data from the high frequency file listed in box 320 for the frequency range to the right of line 336. However, as noted above with respect to FIG. 6, this data should be corrected for amplitude scaling errors by normalizing the data for unity amplitude at 0 Hz (DC) (In practice, 1 Hz is used because measurement of DC amplitude is not reliable). The additional step of removing distortion introduced at the drive's velocity feedback test point may be required depending on the drive type and the technique of measurement. This will happen automatically if the GUI is configured for a drive type that requires this additional step. From the closed loop response 340 and 341, the open loop response 342 and 343 can be calculated, as described above. These open loop amplitude and phase responses 342 and 343 are calculated by the GUI and displayed in boxes 324 and 326 of FIG. 8.

The boxes 322, 324, and 326 of the embodiment of FIG. 8 also include cross-hairs 344 and X's 346 and 348. The X's 346 identify the location of the primary phase margin, and the X's 348 identify the location of the primary gain margin. As noted above, the primary phase margin is the distance between + or −180 degrees and the open loop phase graph 343 (shown in box 326), at the lowest frequency where the open loop amplitude graph 342 (shown in box 324) crosses through 0 dB. In the exemplary composite graph of FIG. 8, the primary phase margin occurs at 31.1 Hz and is 42.4 degrees. The frequency at this point is the bandwidth of the axis velocity loop, and in the data of FIG. 8, this is 31.1 Hz. As can be understood, a system may have one or more secondary phase margins which occur at higher frequencies where the open loop amplitude graph 342 crosses through 0 dB, but these do not appear in FIG. 8.

The primary gain margin is the distance the open loop amplitude graph 342 differs from 0 dB at the lowest frequency where the open loop phase 343 passes through −180 degrees with negative slope. In the data of FIG. 8, this primary gain margin is 11.7 dB, and it occurs at around 120 Hz. A system may have secondary gain margins at higher frequencies, but these do not appear in FIG. 8.

Initially, the GUI locates the cross-hairs 344 on the open loop graphs 342 and 343 at the frequency which defines the primary phase margin (i.e, the bandwidth frequency). In the cross-hairs box 350 is displayed the data from the graphs 342 and 343 (as well the coherence from the coherence graph in box 322) at the location corresponding to the position of the cross-hairs 344. In particular, the frequency at the cross-hairs 344, the open-loop amplitude at the cross-hairs, the open-loop phase at the cross hairs, and the coherence at the cross-hairs are displayed in the box 350. In this embodiment, the cross-hairs 344 may be moved by placing the mouse pointer over one of the vertical cross hair lines, pressing and holding the left mouse button, and dragging the line in the horizontal direction. During this dragging movement, in the boxes 324 and 326, the horizontal cross hairline will move up and down such that the intersection of the cross hair lines remains on the open loop frequency response graphs 342 and 343. As the cross-hairs 344 are moved, the data in box 350 changes. To drop the cross-hairs 344 at a particular location, the left mouse button is let go. If it is desirable to switch the cross-hairs 344 to the closed loop graphs 340 and 341, the mouse can be clicked anywhere on theses graphs where the user would like to attach the cross-hairs 344. The readouts in box 350 will change to correspond to the data for these graphs at the new location of the cross-hairs 344.

Upon entry into the "Analyze Composite FRF" mode of FIG. 8, the controls in the "Stability/Responsiveness" box 360 are activated. Within this box are a "Bandwidth" button 362, a "Phase Margin" button 364, and a "Gain Margin" button 366. Pressing the bandwidth button 362 causes the bandwidth to be calculated, as described above, and to be displayed in the box next to the button. At the same time, the cross-hairs 344 are attached to the open loop frequency response curves 342 and 343 at the bandwidth frequency. Pressing the phase margin button 364 calculates and displays the phase margin at the next highest frequency (higher than the bandwidth frequency) where the open loop amplitude passes through 0 dB. If there is no higher frequency where the amplitude passes through 0 dB, then the primary phase margin is reported (the phase margin at the bandwidth frequency). Pressing the button 364 also causes the cross-hairs 344 to become attached to the open loop curves 342 and 343 at the frequency associated with the particular phase margin that is reported in the box. Similarly, pressing the gain margin button 366 causes the gain margin to be calculated and displayed for the next highest frequency where the phase passes through 180 degrees with negative slope. If there is no higher frequency where the phase has this behavior, then the primary gain margin is displayed. Pressing the gain margin button 366 also causes the cross hairs 344 to attach to the open loop curves 342 and 343 at the frequency displayed in the box.

The "Simulate Gain Change" button 306 is active in the mode of FIG. 8, but not in the mode of FIG. 7. Pressing this button switches the GUI to the mode of FIG. 9, allowing the user the ability to try out some changes to the servo drive (i.e. servocontroller) parameters to see how the change is predicted to affect the open loop and closed loop responses, without having to actually run the machine to determine the effect of the change.

Turning now to FIG. 9, the "Params Tune & Try" box 370 is active in this mode, allowing the user to fill in the "original" parameter values 371 for the compensator used to create the three FRF data files. As shown in FIG. 9, this data can include a proportional gain 372, an integral gain 374, a first low pass filter cutoff frequency 376, and a second lowpass filter cutoff frequency 378. These "original" values 371 can be filled in the data entry boxes during any of the modes of FIGS. 7–9. To indicate that one or more lowpass filters were in fact used during the measurement, a check can be placed in the check boxes for the frequencies 376 and 378, in correspondence with the filters which were used. The parameters in the "Tune & Try" box represent the parameters of a particular drive type represented in the drive's own units system. It is envisioned that the GUI may be reconfigurable for different drive types and that the contents of the "Tune&Try" will change based on the drive type.

Upon entry into the "Simulate Gain Change" mode of FIG. 9, the data edit boxes, sliders, and check boxes for the "test values"(or "proposed" values) 373 in the "Params Tune and Try" box 370 become activated. The numbers in the "test value" edit boxes are initialized to be equal to the values contained in the "original" boxes to their left, and the check boxes for the "test values" 373 are initialized to correspond to those of the "original" values 371. The slider bars in the box 370 allow the test values 373 to be increased or decreased from the initialized values. Alternatively, the "test values" 373 can be typed in the edit boxes manually. Re-typing the "original" values 371 will re-initialize the "test values" 373, however.

The open loop and closed loop responses for these "test values" 373 can be calculated, as described with respect to FIG. 6. Accordingly, when changes are made to the "test values" 373 of box 370, the GUI automatically predicts the open and closed loop FRF responses for these values. In particular, an adjusted open loop amplitude response 380 is shown in box 324, as is an adjusted closed loop amplitude response 382. Also, an adjusted open loop phase response 381 is shown in box 326, as is an adjusted closed loop amplitude response 383. The original response traces 340, 341, 342, and 343 for the "original" compensator values 371 remain in the display boxes 324 and 326, for comparison to the "adjusted" responses. Colors and line types can be used to identify the various original and adjusted response graphs.

In addition, the bandwidth, primary gain margin, and primary phase margin values 360, 362, and 364 can be calculated and displayed based upon the adjusted response curves 380, 381, 382, and 383 which are calculated from the "tests values" of box 370. To view the original open loop response values for bandwidth 360, gain margin 362, or phase margin 362, the cross hairs 344 can be placed on either of the original open loop response curves 342 or 343, or on either of the original closed loop response curves 340 or 341. If the cross hairs 344 are positioned on any of the adjusted response curves, 380, 381, 382 or 383, then the values in box 360 are changed accordingly. Also, pressing the buttons in the box 360 will cause the value to be updated to reflect the adjusted "test values" of box 370. In addition, adjusting the "test values" 373 of box 370 automatically attaches the cross hairs 344 to the open loop curves 380 and 381 for the modified response and re-calculates and displays the corresponding stability values in box 360.

The X's 346 and 348 of FIG. 9 represent the locations of the bandwidth, primary gain margin, and primary phase margin for the adjusted responses for the "test values" 373. Consequently, changing the "test value" parameters 373 causes corresponding changes in the stability numbers in box 360 and corresponding movement of the X's 346 and 348. In this way, the user can modify control parameters (such as proportional gain 372, integral gain 374, and cutoff frequencies 376 and 378) in box 370 and view the effects of these modifications to the stability numbers (bandwidth 360, phase margin 362, and gain margin 364) in box 360, and to the open and closed loop frequency responses (graphs 380, 381, 382, and 383) in boxes 324 and 326. Adjustments to the "test values" 373 can be continually made until an adequate bandwidth, gain margin, and phase margin are displayed in box 360.

Accordingly, the user need not actually try the new parameters on the actual servo control system, but, rather, can merely adjust the "test values" 373 and view the predicted response. Also, the simulated responses for the modified "test values" are based upon actual frequency response data (from the data files of box 308) taken during actual operating conditions of the system, and, accordingly, the inaccuracies of using mathematical assumptions are avoided.

The GUI also preferably includes a note box 390 for indicating pertinent information regarding the tests, and a title box 392 for applying a title to the plot. Printing capability for the plots, screens, and data is also preferably provided.

Figure 10:
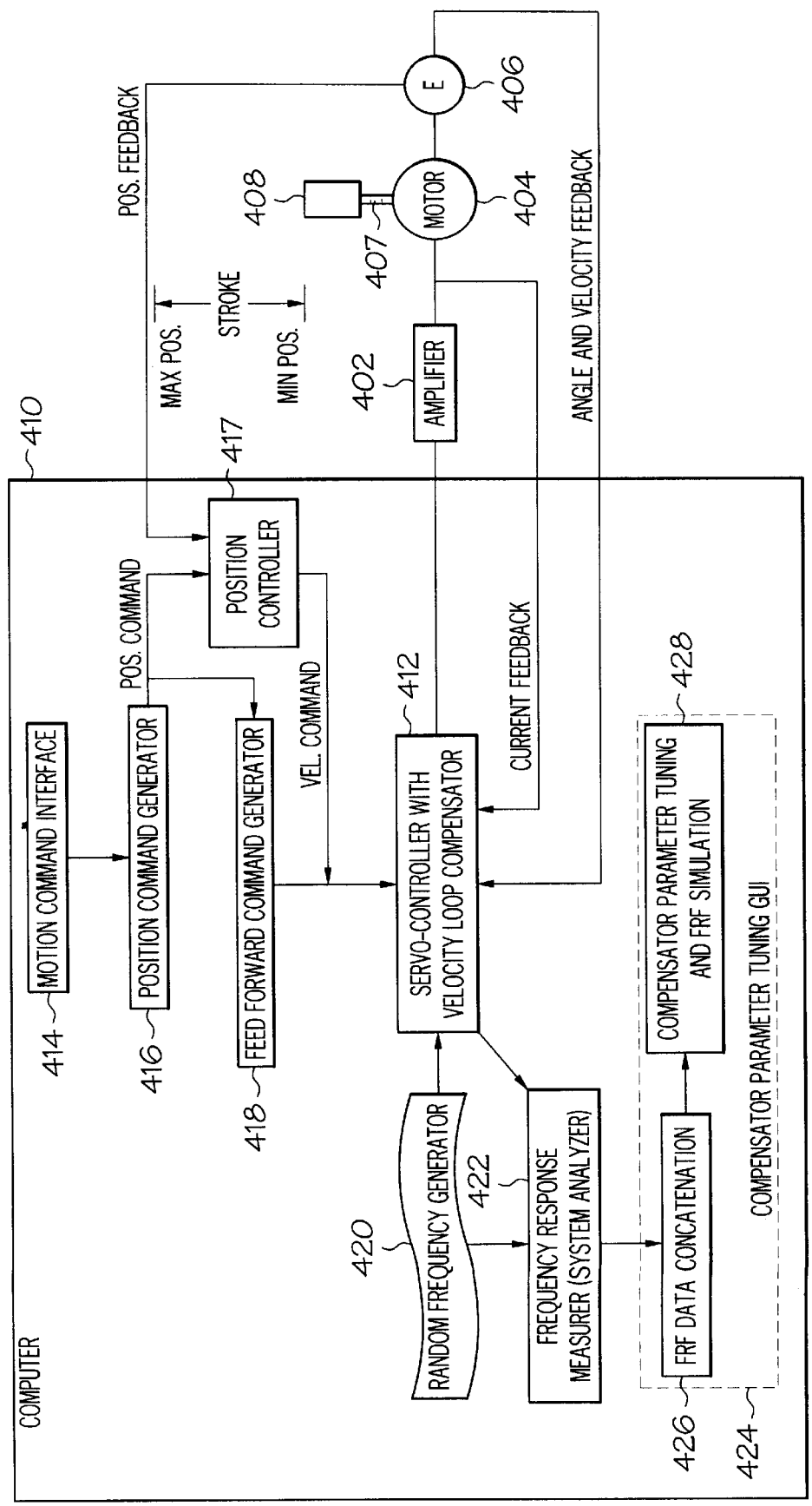
FIG. 10 is a block diagram depicting a system for tuning control parameters by predicting a frequency response for proposed parameters, according to one embodiment of the present invention.

FIG. 10 is a block diagram illustrating an exemplary motion control system which includes parameter tuning apparatus made in accordance with the present invention. It is contemplated that many other configurations for the system are possible. In this exemplary embodiment, an actuator 404 is controlled by a digital servocontroller 412, which is part of a computerized control system 410. Motion commands are provided from the user via a motion command input interface 414. For example, the motion command interface 414 can be used to develop a program (such as a part program in the context of a machine tool system) for movement of the actuator 404. In addition, the motion command interface 414 could also include manual command input capability for executing single motion commands.

In normal operation, a position command generator 416 generates position commands for control of the motor 404 according to the input provided via the interface 414. These commands are compared to position feedback position measurements derived from sensor 406 in a position controller 417 that applies a gain and develops a velocity command component. The velocity command developed by the position loop is summed with a velocity feedforward velocity command. The velocity feedforward command is developed by a feedforward command generator 418 based on position commands. The position loop's velocity command is summed with the velocity feedforward command and is applied as a total velocity command to the servo controller 412. The servo-controller 412 operates on the velocity command, feedback measurements of velocity, and angle from sensor 406, and current feedback measurements from the amplifier 402 to develop a voltage command signals to be fed to a PWM (pulse width modulation) amplifier 402, as known in the art. The servo-controller 412 preferably includes position, velocity, and current feedback loops and commutation functions for producing the voltage commands. To achieve the velocity control, the servocontroller 412 includes a PI or other type of compensator, with programmable gains, as well as one or more lowpass filters, such as are described in the velocity loop diagram of FIG. 1. The servo-controller 412 and PWM amplifier 402, along with a current measuring device for measuring the current from the amplifier, form a current control loop. Other configurations are possible where the tasks of controlling position, velocity, and current are distributed among separate hardware devices.

The voltage commands from the servo-controller 412 control the PWM amplifier 402. Three-phase voltages are switched via the PWM amplifier 402 to the actuator 404, which is preferably an AC electric motor (permanent magnet "brushless DC" motor). Consequently, three phase currents are developed in the lines connecting the amplifier 402 and motor 404, and the amplitudes of these currents are detected and fed back to the servo-controller 412 in a current control loop configuration. In response to the three phase currents, the motor 404 is rotated and a movable member 408 (e.g., a workpiece or tool) connected to the motor 404 via a suitable linkage 407, is moved between a maximum possible position and minimum possible position, which define the range of the axis. An encoder can be used as the sensor 406 for determining the position and velocity of the motor, which are fed back to the servo-controller 412. The present invention will work with any motor and drive type including the type mentioned but also including DC motors, hydraulic servos, linear motors, etc.

To tune the parameters of the servocontroller 412, and in accordance with principles of the present invention, a signal generator 420 is provided to provide random noise excitation to the velocity commands of servocontroller 412 across the frequency range of interest (e.g. 0–1000 Hz). A frequency response measurer 422, such as a dynamic signal analyzer, is also provided to measure the frequency response functions (FRF) of the servocontroller 412 across the range of frequencies provided by the random noise generator 420. The dynamic signal analyzer develops the FRF based on simultaneous measurement of the random noise signal and the velocity feedback signal. This FRF data preferably includes an amplitude response and phase response, as described above. A number of such measurements are preferably taken by the system analyzer 422, during "worst-case" motion of the actuator 404.

A compensator parameter tuning GUI program 424 can then be used to combine the measurements from the system analyzer 422, and to simulate the effects of changing parameters of the servocontroller 412. In particular, a data concatenation module 426 is provided in the GUI 424, as well as a parameter tuning/simulation module 428. The data concatenation module 426 allows the user to combine the various data files generated by the frequency response measurer 422, to create one combined FRF which represents the "worst-case" response across all frequencies of interest. Using this combined FRF, the tuning/simulation module 428 can allow the user to enter parameters (e.g., proportional gain, integral gain, lowpass filter frequencies) which were used when the measurements were taken by the analyzer 422. Using these parameters, an original response function for those servocontroller parameters is calculated by the tuning/simulation unit 428, using known equations for the particular control configuration used.

Then, the tuning/simulation module 428 allows the user to enter new parameters for the servocontroller 412, and can calculate a frequency response function for these new servocontroller parameters. Because the original response function for the original parameters is known, its effect can be removed from the combined FRF, and the effect of the new servocontroller parameters can then be added to the combined FRF, such as by using the equations described above. Accordingly, the frequency response effects of the newly proposed parameters can be simulated by the tuning/simulation unit 428. The stability indicators (e.g. bandwidth, gain margin, and phase margin) for this modified combined FRF can then be viewed to determine if they meet the desired levels. If not, new servocontroller parameters can be entered using the unit 428, and their effect on the FRF determined. Thus, there is not a need to actually run motor 404 to determine the effect of the new parameters.

As can be understood, units in the system 410 can be embodied as one or more program, programs, or sub-programs stored in a persistent storage medium, and executed by one or more controllers or processors. These units can also be embodied as one or more special purpose apparatus having executable instructions stored in a RAM or ROM, or a combination of both. Moreover, the instructions and/or programs can be implemented in any conventional programming language, such as, for example, C, or C++, or can be implemented in a special purpose programming language.

The foregoing descriptions of the preferred embodiments of the invention have been presented for purposes of illustration and description only. They are not intended to be exhaustive or to limit the invention to the precise form disclosed, and modifications and variations are possible and contemplated in light of the above teachings. While a number of preferred and alternate embodiments, methods, systems configurations, and potential applications have been described, it should be understood that many variations and alternatives could be utilized without departing from the scope of the invention. Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A system for tuning a control parameter associated with a motion control system, the motion control system comprising a servocontroller, comprising:
    a noise signal generator configured to provide a noise signal to the servocontroller;
    a frequency response analyzer in communication with the servocontroller and configured to generate frequency responses for the noise signal; and
    a parameter tuning unit in communication with the frequency response analyzer, and configured to simulate an effect on stability of the motion control system using a change in the control parameter and the frequency responses.

2. The system as recited in claim 1, wherein the control parameter comprises servocontroller parameters and wherein the parameter tuning unit is configured to calculate a composite frequency response and composite stability data from the frequency responses, to receive proposed servocontroller parameters, and to calculate a predicted frequency response and predicted stability data for the proposed servocontroller parameters.

3. The system as recited in claim 2, wherein the servocontroller parameters comprise proportional and integral gains.

4. The system as recited in claim 1, wherein each frequency response comprises an amplitude and phase response.

5. The system as recited in claim 2, wherein the parameter tuning unit is further configured to combine a plurality of frequency responses from the frequency response analyzer to generate the composite frequency response.

6. The system as recited in claim 1, further comprising
    an actuator configured to be controlled by the servocontroller; and
    a machine tool member coupled to the actuator.

7. The system as recited in claim 1, wherein the noise signal generator comprises a random noise signal generator.

8. The system as recited in claim 1, wherein the noise signal generator is configured to provide the noise signal during motion controlled by the servocontroller.

9. The system as recited in claim 2, wherein the servocontroller parameters comprise a filter frequency.

10. The system as recited in claim 1, further comprising a motion command generator in communication with the servocontroller.

11. The system as recited in claim 6, further comprising a motion sensor coupled to the actuator, wherein the servocontroller is in communication with the motion sensor.

12. The system as recited in claim 1, wherein the control parameter comprises control loop parameters.

13. The system as recited in claim 1, wherein the frequency response analyzer is configured to directly measure the frequency responses for the noise signal.

14. The system as recited in claim 1, wherein the parameter tuning unit comprises a user interface program.

15. A system for tuning a control parameter associated with a motion control system, comprising:
    a signal generator configured to provide an excitation signal to the motion control system, the motion control system having a frequency response to the excitation signal;
    a frequency response analyzer configured to directly determine the frequency response of the motion control system; and
    a parameter tuning unit in communication with the frequency response analyzer, and configured to simulate an effect on stability of the motion control system using a change in the control parameter and the frequency response of the motion control system.

16. The system as recited in claim 15, further comprising an actuator, wherein the motion control system is configured to generate control signals adapted to control the actuator.

17. The system as recited in claim 15, wherein the excitation signal has energy over a range of frequencies.

18. The system as recited in claim 17, wherein the excitation signal has energy at all frequencies in the range of frequencies.

19. The system as recited in claim 18, wherein the excitation signal has equal energy at all of the frequencies in the range of frequencies.

20. The system as recited in claim 15, wherein the excitation signal is uniformly distributed in amplitude.

21. The system as recited in claim 15, wherein the excitation signal is provided to the motion control system during motion controlled by the motion control system.

22. The system as recited in claim 15, wherein the signal generator comprises a noise signal generator.

23. The system as recited in claim 22, wherein the noise signal generator comprises a random noise signal generator.

24. The system as recited in claim 15, further comprising memory in communication with the frequency response analyzer and configured to store the frequency response of the motion control system.

25. The system as recited in claim 24, wherein the memory is configured to store a plurality of frequency responses of the motion control system.

26. The system as recited in claim 25, wherein the plurality of frequency responses comprise various frequency responses of the motion control system respectively determined by the frequency response analyzer under various operating conditions of the motion control system.

27. The system as recited in claim 25, wherein the parameter tuning unit is in communication with the memory and is configured to combine portions of at least some of the plurality of frequency responses to determine a composite frequency response of the motion control system, and wherein the parameter tuning unit is configured to simulate the effect on stability of the motion control system using the change in the control parameter and the composite frequency response of the motion control system.

28. The system as recited in claim 27, wherein the parameter tuning unit is configured to determine composite stability data from at least some of the plurality of frequency responses.

29. The system as recited in claim 27, wherein the parameter tuning unit is configured to allow a user of the system to select the portions of the plurality of frequency responses and the manner in which the selected portions are combined to determine the composite frequency response.

30. The system as recited in claim 24, wherein the parameter tuning unit is in communication with the memory.

31. The system as recited in claim 15, wherein the frequency response analyzer comprises a dynamic signal analyzer.

32. The system as recited in claim 15, wherein the frequency response analyzer is configured to determine the frequency response of the motion control system by measurement.

33. The system as recited in claim 15, wherein the frequency response analyzer is configured to determine the frequency response of the motion control system across frequencies in a bandwidth of interest.

34. The system as recited in claim 15, wherein the frequency response comprises an amplitude and phase response.

35. The system as recited in claim 15, wherein the frequency response of the motion control system comprises a frequency response of the servocontroller.

36. The system as recited in claim 15, wherein the parameter tuning unit is configured to receive the change in the control parameter from a user.

37. The system as recited in claim 36, wherein the change in the control parameter comprises a proposed control parameter and the simulated effect on stability comprises a representation of a predicted frequency response related to the proposed control parameter.

38. The system as recited in claim 37, wherein the parameter tuning unit is configured to display the predicted frequency response.

39. The system as recited in claim 37, wherein the simulated effect on stability further comprises a representation of predicted stability data related to the proposed control parameter.

40. The system as recited in claim 39, wherein the parameter tuning unit is configured to display the predicted stability data.

41. The system as recited in claim 40, wherein the predicted stability data comprises at least one of a predicted bandwidth, a predicted gain margin, and a predicted phase margin.

42. The system as recited in claim 15, wherein the parameter tuning unit comprises a user interface program.

43. The system as recited in claim 15, wherein the parameter tuning unit is configured to display the frequency response of the motion control system.

44. The system as recited in claim 15, wherein the parameter tuning unit is configured to display stability data related to the frequency response of the motion control system.

45. The system as recited in claim 15, wherein the parameter tuning unit is configured to determine an original response function using the control parameter, determine a modified response function using the change in the control parameter, and calculate a predicted frequency response using the original response function, the modified response function and the frequency response.

46. The system as recited in claim 15, wherein the control parameter comprises servocontroller parameters.

47. The system as recited in claim 15, wherein the control parameter comprises a programmable parameter.

48. The system as recited in claim 15, wherein the control parameter comprises control loop parameters.

49. The system as recited in claim 48, wherein the control loop parameters comprises velocity control loop parameters.

50. The system as recited in claim 49, wherein the velocity control loop parameters comprise at least one of compensator parameters and filter parameters.

51. The system as recited in claim 50, wherein the compensator parameters comprise proportional and integral gains.

52. The system as recited in claim 15, wherein the motion control system comprises a motion command generator configured to generate a motion command and a servocontroller in communication with the motion command generator, the servocontroller being configured to receive the excitation signal and the motion command, wherein the excitation signal is summed with the motion command.

53. The system as recited in claim 52, wherein the motion command comprises a velocity command.

* * * * *